United States Patent
Cheung et al.

(10) Patent No.: US 10,651,020 B2
(45) Date of Patent: May 12, 2020

(54) CAPACITORS AND RADIO FREQUENCY GENERATORS AND OTHER DEVICES USING THEM

(71) Applicant: PERKINELMER HEALTH SCIENCES CANADA, INC., Woodbridge (CA)

(72) Inventors: Tak Shun Cheung, Toronto (CA); Chui Ha Cindy Wong, Markham (CA)

(73) Assignee: PerkinElmer Health Sciences Canada, Inc., Woodbridge (ON) (CA)

(*) Notice: Subject to any disclaimer, the term of this patent is extended or adjusted under 35 U.S.C. 154(b) by 0 days.

(21) Appl. No.: 15/715,523

(22) Filed: Sep. 26, 2017

(65) Prior Publication Data

US 2018/0144922 A1 May 24, 2018

Related U.S. Application Data

(60) Provisional application No. 62/400,271, filed on Sep. 27, 2016.

(51) Int. Cl.
*H01J 49/42* (2006.01)
*H01J 1/02* (2006.01)
(Continued)

(52) U.S. Cl.
CPC ......... *H01J 49/022* (2013.01); *H01G 4/0085* (2013.01); *H01G 4/012* (2013.01); *H01G 4/105* (2013.01); *H01G 4/129* (2013.01); *H01G 4/30* (2013.01); *H01G 4/38* (2013.01); *H01J 1/02* (2013.01); *H01J 49/063* (2013.01); *H01J 49/421* (2013.01); *H01J 49/4215* (2013.01); *H01J 49/4225* (2013.01)

(58) Field of Classification Search
None
See application file for complete search history.

(56) References Cited

U.S. PATENT DOCUMENTS 4,523,121 A * 6/1985 Takahashi ........... H01L 41/0471
310/328
4,835,656 A * 5/1989 Kitahara .................. H01G 4/30
29/25.42

(Continued)

FOREIGN PATENT DOCUMENTS

GB 1428595 A * 3/1976 ............... H01G 2/12
JP 2001266653 A * 9/2001 ................ B22F 1/00

OTHER PUBLICATIONS

Anonymous, "Material Expansion Coefficients", User's Manual. (Year: 2002).*
ISR/WO for PCT/IB2017/055858 dated Jan. 15, 2018.

*Primary Examiner* — Michael J Logie
(74) *Attorney, Agent, or Firm* — Rhodes IP PLC; Christopher R Rhodes

(57) ABSTRACT

Certain configurations of a stable capacitor are described which comprise electrodes produced from materials comprising a selected coefficient of thermal expansion to enhance stability. The electrodes can be spaced from each other through one of more dielectric layers or portions thereof. In some instances, the electrodes comprise integral materials and do not include any thin films. The capacitors can be used, for example, in feedback circuits, radio frequency generators and other devices used with mass filters and/or mass spectrometry devices.

17 Claims, 10 Drawing Sheets

(51) Int. Cl.
*H01J 49/02* (2006.01)
*H01G 4/012* (2006.01)
*H01G 4/10* (2006.01)
*H01G 4/008* (2006.01)
*H01G 4/38* (2006.01)
*H01G 4/30* (2006.01)
*H01G 4/12* (2006.01)
*H01J 49/06* (2006.01)

(56) References Cited

U.S. PATENT DOCUMENTS

| | | | | |
|---|---|---|---|---|
| 5,316,985 | A * | 5/1994 | Jean | C03C 8/14 501/16 |
| 6,081,416 | A * | 6/2000 | Trinh | H01G 4/12 361/308.1 |
| 9,420,679 | B2 | 8/2016 | Cheung | |
| 9,433,073 | B2 | 8/2016 | Cheung | |
| 9,591,737 | B2 | 3/2017 | Cheung | |
| 9,635,750 | B2 | 4/2017 | Cheung | |
| 9,648,717 | B2 | 5/2017 | Cheung | |
| 9,848,486 | B2 | 12/2017 | Cheung | |
| 2003/0034124 | A1* | 2/2003 | Sugaya | H01P 1/20345 156/291 |
| 2003/0102502 | A1* | 6/2003 | Togashi | H01G 4/232 257/303 |
| 2003/0173524 | A1* | 9/2003 | Syka | H01J 49/022 250/292 |
| 2005/0248015 | A1* | 11/2005 | Palanduz | H01L 21/4807 257/684 |
| 2006/0197184 | A1 | 9/2006 | Qi | |
| 2007/0041146 | A1* | 2/2007 | Togashi | H01G 4/012 361/305 |
| 2007/0064375 | A1* | 3/2007 | Urashima | H01G 2/06 361/311 |
| 2007/0121273 | A1* | 5/2007 | Yamamoto | H01G 4/232 361/306.2 |
| 2008/0212257 | A1* | 9/2008 | Sakamoto | H01G 4/008 361/305 |
| 2010/0238602 | A1* | 9/2010 | Capanu | H01G 7/06 361/277 |
| 2011/0084690 | A1* | 4/2011 | Vandermey | G01R 19/003 324/119 |
| 2011/0204750 | A1* | 8/2011 | Fujii | H01L 41/094 310/330 |
| 2013/0015342 | A1* | 1/2013 | Steiner | H01J 49/02 250/282 |
| 2013/0155574 | A1* | 6/2013 | Park | H01G 4/012 361/321.3 |
| 2014/0293564 | A1* | 10/2014 | Murayama | H05K 1/0271 361/767 |
| 2016/0042865 | A1* | 2/2016 | Hong | H01G 4/12 361/301.4 |
| 2016/0268791 | A1* | 9/2016 | Gerl | H02G 3/22 |
| 2016/0293393 | A1* | 10/2016 | Gordon | H01J 49/0031 |

* cited by examiner

CAPACITORS AND RADIO FREQUENCY GENERATORS AND OTHER DEVICES USING THEM

PRIORITY APPLICATION

This application is related to, and claims priority to and the benefit of, U.S. Provisional Application No. 62/400,271 filed on Sep. 27, 2016, the entire disclosure of which is hereby incorporated herein by reference for all purposes.

TECHNOLOGICAL FIELD

This application is directed to capacitors and feedback circuits and radio frequency generators using them. More particularly, certain configurations described herein are directed to a temperature stable capacitor that can include integral material electrodes with a selected coefficient of thermal expansion to enhance stability.

BACKGROUND

Mass filters are used in chemical analyses to determine the composition of chemical substances. An ion beam entering the mass filter is filtered to permit only ions with a selected mass-to-charge (m/z) ratio to pass through the mass filter and on to a detector or other downstream component.

SUMMARY

Various different aspects, embodiments, examples and configurations of capacitors and circuits, radio frequency generators, mass filters, mass spectrometers and other devices and systems are described in detail below. Additional aspects, embodiments, examples and configurations of capacitors and circuits, radio frequency generators, mass filters, mass spectrometers and other devices and systems will be recognized by the person of ordinary skill in the art, given the benefit of this specification.

In one aspect, a capacitor comprises a first dielectric layer, a first electrode comprising an integral material comprising a coefficient of thermal expansion of 15 ppm/deg. Celsius or less a second dielectric layer, in which the first electrode is positioned between the first dielectric layer and the second dielectric layer, a second electrode spatially separated from the first electrode through the second dielectric layer and comprising an integral material comprising a coefficient of thermal expansion of 15 ppm/deg. Celsius or less, and a third dielectric layer, in which the second electrode is positioned between the second dielectric layer and the third dielectric layer, and wherein the coefficient of thermal expansion of each of the first dielectric layer, the second dielectric layer and the third dielectric layer is 15 ppm/deg. Celsius or less.

In certain embodiments, the integral solid material of the first electrode is different from the integral solid material of the second electrode. In other embodiments, the first electrode is mechanically held between the first and second dielectric layers without an adhesive. In some examples, the second electrode is mechanically held between the second and third dielectric layers without an adhesive. In other examples, the capacitor comprises a first adhesive disposed between the first dielectric layer and the second dielectric layer without contacting the first electrode, in which the first adhesive comprises a coefficient of thermal expansion of 15 ppm/deg. Celsius or less. In some embodiments, the capacitor comprises a second adhesive disposed between the second dielectric layer and the third dielectric layer without contacting the second electrode, in which the second adhesive comprises a coefficient of thermal expansion of 15 ppm/deg. Celsius or less.

In some embodiments, the capacitor comprises a first adhesive disposed between the first dielectric layer and the second dielectric layer and contacting a terminal portion of the first electrode, in which the first adhesive comprises a coefficient of thermal expansion of 15 ppm/deg. Celsius or less.

In some examples, the integral solid material of each of the first electrode and the second electrode comprises a metal alloy. In certain examples, the metal alloy comprises a coefficient of thermal expansion of 5 ppm/deg. Celsius or less. In other examples, a dielectric material in at least one of the first dielectric layer, the second dielectric layer and the third dielectric layer is different from a dielectric material in one of the other dielectric layers. In some embodiments, the first dielectric layer and the second dielectric layer comprise the same dielectric material. In certain examples, the first dielectric layer, the second dielectric layer and the third dielectric layer comprise the same dielectric material. In some examples, the dielectric material of the first dielectric layer, the second dielectric layer and the third dielectric layer comprises quartz comprising a coefficient of thermal expansion of 5 ppm/deg. Celsius or less.

In certain instances, the first electrode and the second electrode are constructed and arranged without any films.

In some examples, at least one edge of the first dielectric layer is fused to an edge of the second dielectric layer to retain the first electrode between the first dielectric layer and the second dielectric layer. In some embodiments, at least one edge of the second dielectric layer is fused to an edge of the third dielectric layer to retain the second electrode between the second dielectric layer and the third dielectric layer.

In other embodiments, the capacitor comprises an aperture in the integral material of the first electrode. In some examples, the capacitor comprises an aperture in the integral material of the second electrode.

In certain configurations, the coefficient of thermal expansion of the second dielectric layer is about the same as the coefficient of thermal expansion of the integral material of the first electrode and the same as the coefficient of thermal expansion of the integral material of the second electrode.

In some examples, the capacitor comprises a fourth dielectric layer and a fifth dielectric layer each positioned substantially orthogonal to a planar surface of the first dielectric layer, the second dielectric layer and the third dielectric layer, the fourth dielectric layer positioned on one side of the first dielectric layer, the second dielectric layer and the third dielectric layer and the fifth dielectric layer positioned on an opposite side of the first dielectric layer, the second dielectric layer and the third dielectric layer.

In another aspect, a self-shielded capacitor comprises first, second, third, and fourth dielectric layers coupled to each other, in which a coefficient of thermal expansion of each of the first, second, third and fourth dielectric layers is 15 ppm/deg. Celsius or less. The capacitor may also comprise a first electrode comprising an integral material comprising a coefficient of thermal expansion of 15 ppm/deg. Celsius or less, in which the first electrode is positioned between the first and second dielectric layers. The capacitor may also comprise a second electrode comprising an integral material comprising a coefficient of thermal expansion of 15 ppm/deg. Celsius or less, in which the second electrode is positioned between the second and third dielectric layers. The capacitor may also comprise a third electrode comprising an integral material comprising a coefficient of thermal expansion of 15 ppm/deg. Celsius or less, in which the third electrode is positioned between the third and fourth dielectric layers.

In some instances, the first electrode and the third electrode are positioned to shield the second electrode from stray capacitive energy. In certain examples, the second electrode is configured to carry a feedback signal when electrically coupled to a feedback circuit. In other examples, the first electrode is mechanically held between the first and second dielectric layers without an adhesive, the second electrode is mechanically held between the second and third dielectric layers without an adhesive, and the third electrode is mechanically held between the third and fourth dielectric layers without an adhesive.

In some instances, the capacitor comprises a first adhesive disposed between the first dielectric layer and the second dielectric layer without contacting an area of the first electrode positioned between the first and second dielectric layers, in which the first adhesive comprises a coefficient of thermal expansion of 15 ppm/deg. Celsius or less.

In other instances, the capacitor comprises a second adhesive disposed between the second dielectric layer and the third dielectric layer without contacting the second electrode, in which the second adhesive comprises a coefficient of thermal expansion of 15 ppm/deg. Celsius or less, and further comprising a third adhesive disposed between the third dielectric layer and the fourth dielectric layer without contacting the third electrode, in which the third adhesive comprises a coefficient of thermal expansion of 15 ppm/deg. Celsius or less.

In some examples, the capacitor comprises a first adhesive disposed between the first dielectric layer and the second dielectric layer and contacting a terminal portion of the first electrode, in which the first adhesive comprises a coefficient of thermal expansion of 15 ppm/deg. Celsius or less.

In some embodiments, the integral solid material of each of the first electrode, the second electrode and the third electrode comprises a metal alloy. In some examples, the metal alloy comprises a coefficient of thermal expansion of 5 ppm/deg. Celsius or less. In some embodiments, a dielectric material in at least one of the first dielectric layer, the second dielectric layer, the third dielectric layer and the fourth dielectric layer is different from a dielectric material in one of the other dielectric layers. In certain examples, two of the first dielectric layer, the second dielectric layer, the third dielectric layer and the fourth dielectric layer comprise the same dielectric material. In some examples, the first dielectric layer, the second dielectric layer, the third dielectric layer and the fourth dielectric layer comprise a same dielectric material.

In certain examples, the same dielectric material comprises quartz comprising a coefficient of thermal expansion of 5 ppm/deg. Celsius or less.

In other examples, the first electrode, the second electrode and the third electrode are each constructed and arranged without any films.

In some examples, at least one edge of the first dielectric layer is fused to an edge of the second dielectric layer to retain the first electrode between the first dielectric layer and the second dielectric layer. In certain instances, at least one edge of the second dielectric layer is fused to an edge of the third dielectric layer to retain the second electrode between the second dielectric layer and the third dielectric layer.

In some embodiments, the self-shielded capacitor comprises an aperture in the integral material of the first electrode. In other embodiments, the self-shielded capacitor comprises an aperture in the integral material of at least one of the second electrode, the third electrode and the fourth electrode.

In some examples, the coefficient of thermal expansion of the second dielectric layer and the third dielectric layer is about the same as the coefficient of thermal expansion of the integral material of the second electrode.

In certain examples, the self-shielded capacitor comprises a fifth dielectric layer and a sixth dielectric layer each positioned substantially orthogonal to a planar surface of the first dielectric layer, the second dielectric layer, the third dielectric layer and the fourth dielectric layer, the fifth dielectric layer positioned on one side of the first dielectric layer, the second dielectric layer, the third dielectric layer and the fourth dielectric layer, and the sixth dielectric layer positioned on an opposite side of the first dielectric layer, the second dielectric layer, the third dielectric layer and the fourth dielectric layer.

In an additional aspect, a self-shielded differential capacitor comprises first, second, third, fourth and fifth dielectric layers coupled to each other, in which a coefficient of thermal expansion of each of the first, second, third, fourth and fifth dielectric layers is 15 ppm/deg. Celsius or less. The capacitor may also comprise a first integral electrode comprising an integral material comprising a coefficient of thermal expansion of 15 ppm/deg. Celsius or less, in which the first electrode is positioned between the first and second dielectric layers. The capacitor may also comprise a second integral electrode comprising an integral material comprising a coefficient of thermal expansion of 15 ppm/deg. Celsius or less, in which the second electrode is positioned between the second and third dielectric layers. The capacitor may also comprise a third integral electrode comprising an integral material comprising a coefficient of thermal expansion of 15 ppm/deg. Celsius or less, in which the third electrode is positioned between the third and fourth dielectric layers. The capacitor may also comprise a fourth integral electrode comprising an integral material comprising a coefficient of thermal expansion of 15 ppm/deg. Celsius or less, in which the fourth electrode is positioned between the fourth and fifth dielectric layers.

In certain embodiments, the first integral electrode and the fourth integral electrode are positioned to shield the second integral electrode and the third integral electrode from stray capacitive energy. In other embodiments, the second integral electrode and the third integral electrode are configured to carry a differential feedback signal when electrically coupled to a feedback circuit.

In some examples, the first integral electrode is mechanically held between the first and second dielectric layers without an adhesive, the second integral electrode is mechanically held between the second and third dielectric layers without an adhesive, the third integral electrode is mechanically held between the third and fourth dielectric layers without an adhesive and the fourth integral electrode is mechanically held between the fourth and fifth third dielectric layers without an adhesive.

In other examples, self-shielded capacitor comprises a first adhesive disposed between the first dielectric layer and the second dielectric layer without contacting an area of the first integral electrode positioned between the first and second dielectric layers, in which the first adhesive comprises a coefficient of thermal expansion of 15 ppm/deg. Celsius or less.

In some examples, the self-shielded capacitor comprises a second adhesive disposed between the second dielectric layer and the third dielectric layer without contacting an area of the second integral electrode positioned between the second and third dielectric layers, in which the second adhesive comprises a coefficient of thermal expansion of 15 ppm/deg. Celsius or less, further comprising a third adhesive disposed between the third dielectric layer and the fourth dielectric layer without contacting an area of the third integral electrode positioned between the third and fourth dielectric layers, in which the third adhesive comprises a coefficient of thermal expansion of 15 ppm/deg. Celsius or less, and further comprising a fourth adhesive disposed between the fourth dielectric layer and the fifth dielectric layer without contacting an area of the fourth integral electrode positioned between the fourth and fifth dielectric layers, in which the fourth adhesive comprises a coefficient of thermal expansion of 15 ppm/deg. Celsius or less.

In other examples, the self-shielded capacitor comprises a first adhesive disposed between the first dielectric layer and the second dielectric layer and contacting a terminal portion of the first integral electrode, in which the first adhesive comprises a coefficient of thermal expansion of 15 ppm/deg. Celsius or less.

In additional examples, the integral material of each of the first electrode, the second electrode, the third electrode and the fourth electrode comprises a metal alloy. In other examples, the metal alloy of each of the electrodes comprises a coefficient of thermal expansion of 5 ppm/deg. Celsius or less. In some embodiments, a dielectric material in at least one of the first dielectric layer, the second dielectric layer, the third dielectric layer, the fourth dielectric layer and the fifth dielectric layer is different from a dielectric material in one of the other dielectric layers. In certain examples, two of the first dielectric layer, the second dielectric layer, the third dielectric layer, the fourth dielectric layer and the fifth dielectric layer comprise the same dielectric material. In other examples, the first dielectric layer, the second dielectric layer, the third dielectric layer, the fourth dielectric layer and the fifth dielectric layer comprise a same dielectric material. In some instances, the same dielectric material comprises quartz comprising a coefficient of thermal expansion of 5 ppm/deg. Celsius or less. In some examples, the first electrode, the second electrode, the third electrode and the fourth electrode are each constructed and arranged without any films.

In other examples, at least one edge of the first dielectric layer is fused to an edge of the second dielectric layer to retain the first electrode between the first dielectric layer and the second dielectric layer. In some instances, at least one edge of the second dielectric layer is fused to an edge of the third dielectric layer to retain the second electrode between the second dielectric layer and the third dielectric layer. In certain examples, the self-shielded capacitor comprises an aperture in the integral material of the first integral electrode. In other examples, the self-shielded capacitor comprises an aperture in the integral material of at least one of the second electrode, the third electrode and the fourth electrode.

In some instances, the coefficient of thermal expansion of the second dielectric layer, the third dielectric layer and the fourth dielectric layer is about the same as the coefficient of thermal expansion of the integral material of the second integral electrode and the third integral electrode.

In other instances, the self-shielded capacitor comprises a sixth dielectric layer and a seventh dielectric layer each positioned substantially orthogonal to a planar surface of the first dielectric layer, the second dielectric layer, the third dielectric layer, the fourth dielectric layer and the fifth dielectric layer, the sixth dielectric layer positioned on one side of the first dielectric layer, the second dielectric layer, the third dielectric layer, the fourth dielectric layer and the fifth dielectric layer, and the seventh dielectric layer positioned on an opposite side of the first dielectric layer, the second dielectric layer, the third dielectric layer, the fourth dielectric layer and the fifth dielectric layer.

In another aspect, a method of assembling a capacitor comprises mechanically coupling a first integral electrode to a first dielectric layer and a second dielectric layer by placing the first integral electrode between the first dielectric layer and the second dielectric layer, and mechanically coupling a second integral electrode to a third dielectric layer and the second dielectric layer by placing the second integral electrode between the second dielectric layer and the third dielectric layer, wherein the first and second electrodes are mechanically coupled to the dielectric layers without any adhesive contacting any portion of the first and second electrodes positioned within the dielectric layers.

In some examples, the method comprises configuring each of the first integral electrode and the second integral electrode to comprise a metal alloy. In other examples, the method comprises configuring the metal alloy without any films. In certain examples, the method comprises configuring each of the first dielectric layer and the second dielectric layer to comprise quartz. In some instances, the method comprises coupling the first and second dielectric layers to each other with an adhesive placed at edges of the first and second dielectric layers.

In other examples, the method comprises mechanically coupling a third integral electrode to a fourth dielectric layer and the third dielectric layer by placing the third integral electrode between the third dielectric layer and the fourth dielectric layer, wherein the third integral electrode is mechanically coupled to the third and fourth dielectric layers without any adhesive contacting any portion of the third integral electrode positioned within the third and fourth dielectric layers.

In some instances, the method comprises mechanically coupling a fourth integral electrode to a fifth dielectric layer and the fourth dielectric layer by placing the fourth integral electrode between the fourth dielectric layer and the fifth dielectric layer, wherein the fourth integral electrode is mechanically coupled to the fourth and fifth dielectric layers without any adhesive contacting any portion of the fourth integral electrode positioned within the fourth and fifth dielectric layers.

In other examples, the method comprises coupling a side dielectric layer to at least the first, second and third dielectric layers to retain the first, second and third dielectric layers in a fixed position. In some instances, the method comprises configuring each of the electrodes to comprise a solid metal alloy, and configuring each of the dielectric layers to comprise quartz. In some embodiments, the method comprises configuring the metal alloy to comprise a nickel-iron alloy.

In another aspect, a method of assembling a capacitor comprises spatially positioning a first integral electrode from a second integral electrode in a mold, disposing nor pouring a liquid dielectric material into the mold to provide liquid dielectric material between the spatially positioned the first integral electrode and the second integral electrode, and permitting the liquid dielectric material to solidify to mechanically couple the first integral electrode and the second integral electrode to the dielectric material and provide a layer of dielectric material between the first integral electrode and the second integral electrode.

In some examples, the method comprises configuring each of the first integral electrode and the second integral electrode to comprise a metal alloy. In other examples, the method comprises configuring the metal alloy without any films. In some examples, the method comprises configuring the dielectric material to comprise quartz. In certain examples, the method comprises coupling a side dielectric layer to the capacitor. In certain embodiments, the method comprises placing a third integral electrode in the mold prior to disposing the liquid dielectric material in the mold, wherein the third integral electrode is placed to provide a layer of the dielectric material between the second integral electrode and the third integral electrode. In some examples, the method comprises placing a fourth integral electrode in the mold prior to disposing the liquid dielectric material in the mold, wherein the fourth integral electrode is placed to provide a layer of the dielectric material between the third integral electrode and the fourth integral electrode. In other examples, the method comprises coupling a side dielectric layer to the capacitor. In some examples, the method comprises configuring each of the electrodes to comprise a solid metal alloy, and configuring the dielectric material to comprise quartz. In certain instances, the method comprises configuring the metal alloy to comprise a nickel-iron alloy.

In another aspect, a mass filter comprises a multipole assembly comprising a first pole, a second pole, a third pole and a fourth pole. The mass filter may also comprise a radio frequency generator electrically coupled to each of the first pole, the second pole, the third pole and the fourth pole of the multipole assembly, the radio frequency generator comprising a feedback circuit comprising a capacitor. The capacitor may comprise a first dielectric layer, a first electrode comprising an integral material comprising a coefficient of thermal expansion of 15 ppm/deg. Celsius or less, a second dielectric layer, in which the first electrode is positioned between the first dielectric layer and the second dielectric layer, a second electrode spatially separated from the first electrode through the second dielectric layer and comprising an integral material comprising a coefficient of thermal expansion of 15 ppm/deg. Celsius or less, and a third dielectric layer, in which the second electrode is positioned between the second dielectric layer and the third dielectric layer, and wherein the coefficient of thermal expansion of each of the first dielectric layer, the second dielectric layer and the third dielectric layer is 15 ppm/deg. Celsius or less.

In some examples, the integral solid material of the first electrode is different from the integral solid material of the second electrode. In other examples, the first electrode is mechanically held between the first and second dielectric layers without an adhesive. In certain instances, the second electrode is mechanically held between the second and third dielectric layers without an adhesive.

In some examples, the mass filter comprises a first adhesive disposed between the first dielectric layer and the second dielectric layer without contacting the first electrode, in which the first adhesive comprises a coefficient of thermal expansion of 15 ppm/deg. Celsius or less. In other examples, the mass filter comprises a second adhesive disposed between the second dielectric layer and the third dielectric layer without contacting the second electrode, in which the second adhesive comprises a coefficient of thermal expansion of 15 ppm/deg. Celsius or less.

In certain embodiments, the mass filter comprises a first adhesive disposed between the first dielectric layer and the second dielectric layer and contacting a terminal portion of the first electrode, in which the first adhesive comprises a coefficient of thermal expansion of 15 ppm/deg. Celsius or less.

In other embodiments, the integral solid material of each of the first electrode and the second electrode comprises a metal alloy. In some instances, the metal alloy comprises a coefficient of thermal expansion of 5 ppm/deg. Celsius or less. In other instances, the mass filter comprises a dielectric material in at least one of the first dielectric layer, the second dielectric layer and the third dielectric layer that is different from a dielectric material in one of the other dielectric layers. In some embodiments, the first dielectric layer and the second dielectric layer comprise the same dielectric material. In other embodiments, the first dielectric layer, the second dielectric layer and the third dielectric layer comprise the same dielectric material. In some examples, the dielectric material of the first dielectric layer, the second dielectric layer and the third dielectric layer comprises quartz comprising a coefficient of thermal expansion of 5 ppm/deg. Celsius or less.

In some examples, the first electrode and the second electrode are constructed and arranged without any films. In other examples, at least one edge of the first dielectric layer is fused to an edge of the second dielectric layer to retain the first electrode between the first dielectric layer and the second dielectric layer. In some examples, at least one edge of the second dielectric layer is fused to an edge of the third dielectric layer to retain the second electrode between the second dielectric layer and the third dielectric layer.

In certain embodiments, the mass filter comprises an aperture in the integral material of the first electrode. In other embodiments, the mass filter comprises an aperture in the integral material of the second electrode.

In some configurations, the coefficient of thermal expansion of the second dielectric layer is about the same as the coefficient of thermal expansion of the integral material of the first electrode and the same as the coefficient of thermal expansion of the integral material of the second electrode.

In other configurations, the mass filter comprises a fourth dielectric layer and a fifth dielectric layer each positioned substantially orthogonal to a planar surface of the first dielectric layer, the second dielectric layer and the third dielectric layer, the fourth dielectric layer positioned on one side of the first dielectric layer, the second dielectric layer and the third dielectric layer and the fifth dielectric layer positioned on an opposite side of the first dielectric layer, the second dielectric layer and the third dielectric layer.

In an additional aspect, a mass filter comprises a multipole assembly comprising a first pole, a second pole, a third pole and a fourth pole. The mass filter may also comprise a radio frequency generator electrically coupled to each of the first pole, the second pole, the third pole and the fourth pole of the multipole assembly, the radio frequency generator comprising a feedback circuit comprising a self-shielded capacitor. The self-shielded capacitor may comprise first, second, third, and fourth dielectric layers coupled to each other, in which a coefficient of thermal expansion of each of the first, second, third and fourth dielectric layers is 15 ppm/deg. Celsius or less, a first electrode comprising an integral material comprising a coefficient of thermal expansion of 15 ppm/deg. Celsius or less, in which the first electrode is positioned between the first and second dielectric layers, a second electrode comprising an integral material comprising a coefficient of thermal expansion of 15 ppm/deg. Celsius or less, in which the second electrode is positioned between the second and third dielectric layers, and a third electrode comprising an integral material comprising a coefficient of thermal expansion of 15 ppm/deg. Celsius or less, in which the third electrode is positioned between the third and fourth dielectric layers.

In certain examples, the first electrode and the third electrode are positioned to shield the second electrode from stray capacitive energy. In other examples, the second electrode is configured to carry a feedback signal when electrically coupled to a feedback circuit. In some embodiments, the first electrode is mechanically held between the first and second dielectric layers without an adhesive, the second electrode is mechanically held between the second and third dielectric layers without an adhesive, and the third electrode is mechanically held between the third and fourth dielectric layers without an adhesive. In some examples, the mass filter comprises a first adhesive disposed between the first dielectric layer and the second dielectric layer without contacting an area of the first electrode positioned between the first and second dielectric layers, in which the first adhesive comprises a coefficient of thermal expansion of 15 ppm/deg. Celsius or less. In some examples, the mass filter comprises a second adhesive disposed between the second dielectric layer and the third dielectric layer without contacting the second electrode, in which the second adhesive comprises a coefficient of thermal expansion of 15 ppm/deg. Celsius or less, and further comprising a third adhesive disposed between the third dielectric layer and the fourth dielectric layer without contacting the third electrode, in which the third adhesive comprises a coefficient of thermal expansion of 15 ppm/deg. Celsius or less. In other examples, the mass filter comprises a first adhesive disposed between the first dielectric layer and the second dielectric layer and contacting a terminal portion of the first electrode, in which the first adhesive comprises a coefficient of thermal expansion of 15 ppm/deg. Celsius or less.

In some embodiments, the integral solid material of each of the first electrode, the second electrode and the third electrode comprises a metal alloy. In other embodiments, the metal alloy comprises a coefficient of thermal expansion of 5 ppm/deg. Celsius or less. In some examples, a dielectric material in at least one of the first dielectric layer, the second dielectric layer, the third dielectric layer and the fourth dielectric layer is different from a dielectric material in one of the other dielectric layers. In other examples, two of the first dielectric layer, the second dielectric layer, the third dielectric layer and the fourth dielectric layer comprise the same dielectric material. In some instances, the first dielectric layer, the second dielectric layer, the third dielectric layer and the fourth dielectric layer comprise a same dielectric material. In further examples, the same dielectric material comprises quartz comprising a coefficient of thermal expansion of 5 ppm/deg. Celsius or less. In some instances, the first electrode, the second electrode and the third electrode are each constructed and arranged without any films.

In some examples, at least one edge of the first dielectric layer is fused to an edge of the second dielectric layer to retain the first electrode between the first dielectric layer and the second dielectric layer. In other examples, at least one edge of the second dielectric layer is fused to an edge of the third dielectric layer to retain the second electrode between the second dielectric layer and the third dielectric layer.

In some embodiments, the mass filter comprises an aperture in the integral material of the first electrode. In other embodiments, the mass filter comprises an aperture in the integral material of at least one of the second electrode, the third electrode and the fourth electrode.

In certain examples, the coefficient of thermal expansion of the second dielectric layer and the third dielectric layer is about the same as the coefficient of thermal expansion of the integral material of the second electrode.

In some examples, the mass filter comprises a fifth dielectric layer and a sixth dielectric layer each positioned substantially orthogonal to a planar surface of the first dielectric layer, the second dielectric layer, the third dielectric layer and the fourth dielectric layer, the fifth dielectric layer positioned on one side of the first dielectric layer, the second dielectric layer, the third dielectric layer and the fourth dielectric layer, and the sixth dielectric layer positioned on an opposite side of the first dielectric layer, the second dielectric layer, the third dielectric layer and the fourth dielectric layer.

In an additional aspect, a mass filter comprises a multipole assembly comprising a first pole, a second pole, a third pole and a fourth pole, a radio frequency generator electrically coupled to each of the first pole, the second pole, the third pole and the fourth pole of the multipole assembly, the radio frequency generator comprising a feedback circuit comprising a self-shielded differential capacitor. The self-shielded differential capacitor may comprise first, second, third, fourth and fifth dielectric layers coupled to each other, in which a coefficient of thermal expansion of each of the first, second, third, fourth and fifth dielectric layers is 15 ppm/deg. Celsius or less, a first integral electrode comprising an integral material comprising a coefficient of thermal expansion of 15 ppm/deg. Celsius or less, in which the first electrode is positioned between the first and second dielectric layers, a second integral electrode comprising an integral material comprising a coefficient of thermal expansion of 15 ppm/deg. Celsius or less, in which the second electrode is positioned between the second and third dielectric layers, a third integral electrode comprising an integral material comprising a coefficient of thermal expansion of 15 ppm/deg. Celsius or less, in which the third electrode is positioned between the third and fourth dielectric layers, and a fourth integral electrode comprising an integral material comprising a coefficient of thermal expansion of 15 ppm/deg. Celsius or less, in which the fourth electrode is positioned between the fourth and fifth dielectric layers.

In certain embodiments, the first integral electrode and the fourth integral electrode are positioned to shield the second integral electrode and the third integral electrode from stray capacitive energy. In other embodiments, the second integral electrode and the third integral electrode are configured to carry a differential feedback signal when electrically coupled to a feedback circuit. In some examples, the first integral electrode is mechanically held between the first and second dielectric layers without an adhesive, the second integral electrode is mechanically held between the second and third dielectric layers without an adhesive, the third integral electrode is mechanically held between the third and fourth dielectric layers without an adhesive and the fourth integral electrode is mechanically held between the fourth and fifth third dielectric layers without an adhesive.

In other examples, the mass filter comprises a first adhesive disposed between the first dielectric layer and the second dielectric layer without contacting an area of the first integral electrode positioned between the first and second dielectric layers, in which the first adhesive comprises a coefficient of thermal expansion of 15 ppm/deg. Celsius or less. In some examples, the mass filter comprises a second adhesive disposed between the second dielectric layer and the third dielectric layer without contacting an area of the second integral electrode positioned between the second and third dielectric layers, in which the second adhesive comprises a coefficient of thermal expansion of 15 ppm/deg. Celsius or less, further comprising a third adhesive disposed between the third dielectric layer and the fourth dielectric layer without contacting an area of the third integral electrode positioned between the third and fourth dielectric layers, in which the third adhesive comprises a coefficient of thermal expansion of 15 ppm/deg. Celsius or less, and further comprising a fourth adhesive disposed between the fourth dielectric layer and the fifth dielectric layer without contacting an area of the fourth integral electrode positioned between the fourth and fifth dielectric layers, in which the fourth adhesive comprises a coefficient of thermal expansion of 15 ppm/deg. Celsius or less.

In some examples, the mass filter comprises a first adhesive disposed between the first dielectric layer and the second dielectric layer and contacting a terminal portion of the first integral electrode, in which the first adhesive comprises a coefficient of thermal expansion of 15 ppm/deg. Celsius or less.

In other examples, the integral material of each of the first electrode, the second electrode, the third electrode and the fourth electrode comprises a metal alloy. In some instances, the metal alloy of each of the electrodes comprises a coefficient of thermal expansion of 5 ppm/deg. Celsius or less. In other examples, a dielectric material in at least one of the first dielectric layer, the second dielectric layer, the third dielectric layer, the fourth dielectric layer and the fifth dielectric layer is different from a dielectric material in one of the other dielectric layers. In some embodiments, two of the first dielectric layer, the second dielectric layer, the third dielectric layer, the fourth dielectric layer and the fifth dielectric layer comprise the same dielectric material. In some examples, the first dielectric layer, the second dielectric layer, the third dielectric layer, the fourth dielectric layer and the fifth dielectric layer comprise a same dielectric material. In other examples, the same dielectric material comprises quartz comprising a coefficient of thermal expansion of 5 ppm/deg. Celsius or less.

In certain examples, the first electrode, the second electrode, the third electrode and the fourth electrode are each constructed and arranged without any films. In some embodiments, at least one edge of the first dielectric layer is fused to an edge of the second dielectric layer to retain the first electrode between the first dielectric layer and the second dielectric layer. In other embodiments, at least one edge of the second dielectric layer is fused to an edge of the third dielectric layer to retain the second electrode between the second dielectric layer and the third dielectric layer.

In certain examples, the mass filter comprises an aperture in the integral material of the first integral electrode. In some examples, the mass filter comprises an aperture in the integral material of at least one of the second electrode, the third electrode and the fourth electrode.

In some embodiments, the coefficient of thermal expansion of the second dielectric layer, the third dielectric layer and the fourth dielectric layer is about the same as the coefficient of thermal expansion of the integral material of the second integral electrode and the third integral electrode.

In certain examples, the mass filter comprises a sixth dielectric layer and a seventh dielectric layer each positioned substantially orthogonal to a planar surface of the first dielectric layer, the second dielectric layer, the third dielectric layer, the fourth dielectric layer and the fifth dielectric layer, the sixth dielectric layer positioned on one side of the first dielectric layer, the second dielectric layer, the third dielectric layer, the fourth dielectric layer and the fifth dielectric layer, and the seventh dielectric layer positioned on an opposite side of the first dielectric layer, the second dielectric layer, the third dielectric layer, the fourth dielectric layer and the fifth dielectric layer.

In another aspect, a mass spectrometer comprises a sample introduction device, an ionization source fluidically coupled to the sample introduction device, and a mass filter fluidically coupled to the ionization source. The mass filter may comprise a multipole assembly, and a radio frequency generator electrically coupled to each of the first pole, the second pole, the third pole and the fourth pole of the multipole assembly, the radio frequency generator comprising a feedback circuit comprising a capacitor. In some examples, the capacitor comprises a first dielectric layer, a first electrode comprising an integral material comprising a coefficient of thermal expansion of 15 ppm/deg. Celsius or less, a second dielectric layer, in which the first electrode is positioned between the first dielectric layer and the second dielectric layer, a second electrode spatially separated from the first electrode through the second dielectric layer and comprising an integral material comprising a coefficient of thermal expansion of 15 ppm/deg. Celsius or less, and a third dielectric layer, in which the second electrode is positioned between the second dielectric layer and the third dielectric layer, and wherein the coefficient of thermal expansion of each of the first dielectric layer, the second dielectric layer and the third dielectric layer is 15 ppm/deg. Celsius or less.

In certain examples, the integral solid material of the first electrode is different from the integral solid material of the second electrode. In other examples, the first electrode is mechanically held between the first and second dielectric layers without an adhesive. In some embodiments, the second electrode is mechanically held between the second and third dielectric layers without an adhesive.

In some examples, the mass spectrometer comprises a first adhesive disposed between the first dielectric layer and the second dielectric layer without contacting the first electrode, in which the first adhesive comprises a coefficient of thermal expansion of 15 ppm/deg. Celsius or less. In other examples, the mass spectrometer comprises a second adhesive disposed between the second dielectric layer and the third dielectric layer without contacting the second electrode, in which the second adhesive comprises a coefficient of thermal expansion of 15 ppm/deg. Celsius or less.

In some embodiments, the mass spectrometer comprises a first adhesive disposed between the first dielectric layer and the second dielectric layer and contacting a terminal portion of the first electrode, in which the first adhesive comprises a coefficient of thermal expansion of 15 ppm/deg. Celsius or less.

In some examples, the integral solid material of each of the first electrode and the second electrode comprises a metal alloy. In other examples, the metal alloy comprises a coefficient of thermal expansion of 5 ppm/deg. Celsius or less. In some embodiments, a dielectric material in at least one of the first dielectric layer, the second dielectric layer and the third dielectric layer is different from a dielectric material in one of the other dielectric layers. In other examples, the first dielectric layer and the second dielectric layer comprise the same dielectric material. In some examples, the first dielectric layer, the second dielectric layer and the third dielectric layer comprise the same dielectric material. In some embodiments, the dielectric material of the first dielectric layer, the second dielectric layer and the third dielectric layer comprises quartz comprising a coefficient of thermal expansion of 5 ppm/deg. Celsius or less.

In some examples, the first electrode and the second electrode are constructed and arranged without any films. In other examples, at least one edge of the first dielectric layer is fused to an edge of the second dielectric layer to retain the first electrode between the first dielectric layer and the second dielectric layer. In some examples, at least one edge of the second dielectric layer is fused to an edge of the third dielectric layer to retain the second electrode between the second dielectric layer and the third dielectric layer.

In some embodiments, the mass spectrometer comprises an aperture in the integral material of the first electrode. In other embodiments, the mass spectrometer comprises an aperture in the integral material of the second electrode.

In some examples, the coefficient of thermal expansion of the second dielectric layer is about the same as the coefficient of thermal expansion of the integral material of the first electrode and the same as the coefficient of thermal expansion of the integral material of the second electrode. In other examples, the capacitor further comprises a fourth dielectric layer and a fifth dielectric layer each positioned substantially orthogonal to a planar surface of the first dielectric layer, the second dielectric layer and the third dielectric layer, the fourth dielectric layer positioned on one side of the first dielectric layer, the second dielectric layer and the third dielectric layer and the fifth dielectric layer positioned on an opposite side of the first dielectric layer, the second dielectric layer and the third dielectric layer.

In an additional aspect, a mass spectrometer comprises a sample introduction device, an ionization source fluidically coupled to the sample introduction device, a mass filter fluidically coupled to the ionization source, the mass filter comprising a multipole assembly, and a radio frequency generator electrically coupled to each of the first pole, the second pole, the third pole and the fourth pole of the multipole assembly, the radio frequency generator comprising a feedback circuit comprising a self-shielded capacitor. For example, the self-shielded capacitor may comprise first, second, third, and fourth dielectric layers coupled to each other, in which a coefficient of thermal expansion of each of the first, second, third and fourth dielectric layers is 15 ppm/deg. Celsius or less, a first electrode comprising an integral material comprising a coefficient of thermal expansion of 15 ppm/deg. Celsius or less, in which the first electrode is positioned between the first and second dielectric layers, a second electrode comprising an integral material comprising a coefficient of thermal expansion of 15 ppm/deg. Celsius or less, in which the second electrode is positioned between the second and third dielectric layers, and a third electrode comprising an integral material comprising a coefficient of thermal expansion of 15 ppm/deg. Celsius or less, in which the third electrode is positioned between the third and fourth dielectric layers.

In some examples, the first electrode and the third electrode are positioned to shield the second electrode from stray capacitive energy. In certain examples, the second electrode is configured to carry a feedback signal when electrically coupled to a feedback circuit. In other examples, the first electrode is mechanically held between the first and second dielectric layers without an adhesive, the second electrode is mechanically held between the second and third dielectric layers without an adhesive, and the third electrode is mechanically held between the third and fourth dielectric layers without an adhesive. In some embodiments, the mass spectrometer comprises a first adhesive disposed between the first dielectric layer and the second dielectric layer without contacting an area of the first electrode positioned between the first and second dielectric layers, in which the first adhesive comprises a coefficient of thermal expansion of 15 ppm/deg. Celsius or less. In other examples, the mass spectrometer comprises a second adhesive disposed between the second dielectric layer and the third dielectric layer without contacting the second electrode, in which the second adhesive comprises a coefficient of thermal expansion of 15 ppm/deg. Celsius or less, and further comprising a third adhesive disposed between the third dielectric layer and the fourth dielectric layer without contacting the third electrode, in which the third adhesive comprises a coefficient of thermal expansion of 15 ppm/deg. Celsius or less.

In some examples, the mass spectrometer comprises a first adhesive disposed between the first dielectric layer and the second dielectric layer and contacting a terminal portion of the first electrode, in which the first adhesive comprises a coefficient of thermal expansion of 15 ppm/deg. Celsius or less.

In other examples, the integral solid material of each of the first electrode, the second electrode and the third electrode comprises a metal alloy. In some examples, the metal alloy comprises a coefficient of thermal expansion of 5 ppm/deg. Celsius or less. In other examples, a dielectric material in at least one of the first dielectric layer, the second dielectric layer, the third dielectric layer and the fourth dielectric layer is different from a dielectric material in one of the other dielectric layers.

In some embodiments, two of the first dielectric layer, the second dielectric layer, the third dielectric layer and the fourth dielectric layer comprise the same dielectric material. In other embodiments, the first dielectric layer, the second dielectric layer, the third dielectric layer and the fourth dielectric layer comprise a same dielectric material. In some configurations, the same dielectric material comprises quartz comprising a coefficient of thermal expansion of 5 ppm/deg. Celsius or less. In other examples, the first electrode, the second electrode and the third electrode are each constructed and arranged without any films.

In some embodiments, at least one edge of the first dielectric layer is fused to an edge of the second dielectric layer to retain the first electrode between the first dielectric layer and the second dielectric layer. In other embodiments, at least one edge of the second dielectric layer is fused to an edge of the third dielectric layer to retain the second electrode between the second dielectric layer and the third dielectric layer.

In some examples, the mass spectrometer comprises an aperture in the integral material of the first electrode. In other examples, the mass spectrometer comprises an aperture in the integral material of at least one of the second electrode, the third electrode and the fourth electrode.

In certain embodiments, the coefficient of thermal expansion of the second dielectric layer and the third dielectric layer is about the same as the coefficient of thermal expansion of the integral material of the second electrode.

In some examples, the mass spectrometer comprises a fifth dielectric layer and a sixth dielectric layer each positioned substantially orthogonal to a planar surface of the first dielectric layer, the second dielectric layer, the third dielectric layer and the fourth dielectric layer, the fifth dielectric layer positioned on one side of the first dielectric layer, the second dielectric layer, the third dielectric layer and the fourth dielectric layer, and the sixth dielectric layer positioned on an opposite side of the first dielectric layer, the second dielectric layer, the third dielectric layer and the fourth dielectric layer.

In another aspect, a mass spectrometer comprises a sample introduction device, an ionization source fluidically coupled to the sample introduction device, a mass filter fluidically coupled to the ionization source, the mass filter comprising a multipole assembly, and a radio frequency generator electrically coupled to each of the first pole, the second pole, the third pole and the fourth pole of the multipole assembly, the radio frequency generator comprising a feedback circuit comprising a self-shielded differential capacitor. The self-shielded differential capacitor may comprise first, second, third, fourth and fifth dielectric layers coupled to each other, in which a coefficient of thermal expansion of each of the first, second, third, fourth and fifth dielectric layers is 15 ppm/deg. Celsius or less, a first integral electrode comprising an integral material comprising a coefficient of thermal expansion of 15 ppm/deg. Celsius or less, in which the first electrode is positioned between the first and second dielectric layers, a second integral electrode comprising an integral material comprising a coefficient of thermal expansion of 15 ppm/deg. Celsius or less, in which the second electrode is positioned between the second and third dielectric layers, a third integral electrode comprising an integral material comprising a coefficient of thermal expansion of 15 ppm/deg. Celsius or less, in which the third electrode is positioned between the third and fourth dielectric layers, and a fourth integral electrode comprising an integral material comprising a coefficient of thermal expansion of 15 ppm/deg. Celsius or less, in which the fourth electrode is positioned between the fourth and fifth dielectric layers.

In certain embodiments, the first integral electrode and the fourth integral electrode are positioned to shield the second integral electrode and the third integral electrode from stray capacitive energy. In some examples, the second integral electrode and the third integral electrode are configured to carry a differential feedback signal when electrically coupled to a feedback circuit. In other examples, the first integral electrode is mechanically held between the first and second dielectric layers without an adhesive, the second integral electrode is mechanically held between the second and third dielectric layers without an adhesive, the third integral electrode is mechanically held between the third and fourth dielectric layers without an adhesive and the fourth integral electrode is mechanically held between the fourth and fifth third dielectric layers without an adhesive. In some examples, the mass spectrometer comprises a first adhesive disposed between the first dielectric layer and the second dielectric layer without contacting an area of the first integral electrode positioned between the first and second dielectric layers, in which the first adhesive comprises a coefficient of thermal expansion of 15 ppm/deg. Celsius or less. In other examples, the mass spectrometer comprises a second adhesive disposed between the second dielectric layer and the third dielectric layer without contacting an area of the second integral electrode positioned between the second and third dielectric layers, in which the second adhesive comprises a coefficient of thermal expansion of 15 ppm/deg. Celsius or less, further comprising a third adhesive disposed between the third dielectric layer and the fourth dielectric layer without contacting an area of the third integral electrode positioned between the third and fourth dielectric layers, in which the third adhesive comprises a coefficient of thermal expansion of 15 ppm/deg. Celsius or less, and further comprising a fourth adhesive disposed between the fourth dielectric layer and the fifth dielectric layer without contacting an area of the fourth integral electrode positioned between the fourth and fifth dielectric layers, in which the fourth adhesive comprises a coefficient of thermal expansion of 15 ppm/deg. Celsius or less. In additional examples, the mass spectrometer comprises a first adhesive disposed between the first dielectric layer and the second dielectric layer and contacting a terminal portion of the first integral electrode, in which the first adhesive comprises a coefficient of thermal expansion of 15 ppm/deg. Celsius or less.

In some embodiments, the integral material of each of the first electrode, the second electrode, the third electrode and the fourth electrode comprises a metal alloy. In other examples, the metal alloy of each of the electrodes comprises a coefficient of thermal expansion of 5 ppm/deg. Celsius or less. In some instances, a dielectric material in at least one of the first dielectric layer, the second dielectric layer, the third dielectric layer, the fourth dielectric layer and the fifth dielectric layer is different from a dielectric material in one of the other dielectric layers. In other instances, two of the first dielectric layer, the second dielectric layer, the third dielectric layer, the fourth dielectric layer and the fifth dielectric layer comprise the same dielectric material. In some examples, the first dielectric layer, the second dielectric layer, the third dielectric layer, the fourth dielectric layer and the fifth dielectric layer comprise a same dielectric material. In certain examples, the same dielectric material comprises quartz comprising a coefficient of thermal expansion of 5 ppm/deg. Celsius or less.

In other examples, the first electrode, the second electrode, the third electrode and the fourth electrode are each constructed and arranged without any films. In some examples, at least one edge of the first dielectric layer is fused to an edge of the second dielectric layer to retain the first electrode between the first dielectric layer and the second dielectric layer. In certain embodiments, at least one edge of the second dielectric layer is fused to an edge of the third dielectric layer to retain the second electrode between the second dielectric layer and the third dielectric layer.

In some examples, the mass spectrometer comprises an aperture in the integral material of the first integral electrode. In certain examples, the mass spectrometer comprises an aperture in the integral material of at least one of the second electrode, the third electrode and the fourth electrode.

In some examples, the coefficient of thermal expansion of the second dielectric layer, the third dielectric layer and the fourth dielectric layer is about the same as the coefficient of thermal expansion of the integral material of the second integral electrode and the third integral electrode.

In other examples, the mass spectrometer comprises a sixth dielectric layer and a seventh dielectric layer each positioned substantially orthogonal to a planar surface of the first dielectric layer, the second dielectric layer, the third dielectric layer, the fourth dielectric layer and the fifth dielectric layer, the sixth dielectric layer positioned on one side of the first dielectric layer, the second dielectric layer, the third dielectric layer, the fourth dielectric layer and the fifth dielectric layer, and the seventh dielectric layer positioned on an opposite side of the first dielectric layer, the second dielectric layer, the third dielectric layer, the fourth dielectric layer and the fifth dielectric layer.

In another aspect, a radiofrequency generator configured to electrically couple to a multipole assembly of a mass spectrometer is provided. In some examples, the radio frequency generator comprises a feedback circuit comprising a capacitor. The capacitor may comprise a first dielectric layer, a first electrode comprising an integral material comprising a coefficient of thermal expansion of 15 ppm/deg. Celsius or less, a second dielectric layer, in which the first electrode is positioned between the first dielectric layer and the second dielectric layer, a second electrode spatially separated from the first electrode through the second dielectric layer and comprising an integral material comprising a coefficient of thermal expansion of 15 ppm/deg. Celsius or less, and a third dielectric layer, in which the second electrode is positioned between the second dielectric layer and the third dielectric layer, and wherein the coefficient of thermal expansion of each of the first dielectric layer, the second dielectric layer and the third dielectric layer is 15 ppm/deg. Celsius or less.

In an additional aspect, a radiofrequency generator configured to electrically couple to a multipole assembly of a mass spectrometer is described that comprises a feedback circuit comprising a self-shielded capacitor. The self-shielded capacitor may comprise first, second, third, and fourth dielectric layers coupled to each other, in which a coefficient of thermal expansion of each of the first, second, third and fourth dielectric layers is 15 ppm/deg. Celsius or less, a first electrode comprising an integral material comprising a coefficient of thermal expansion of 15 ppm/deg. Celsius or less, in which the first electrode is positioned between the first and second dielectric layers, a second electrode comprising an integral material comprising a coefficient of thermal expansion of 15 ppm/deg. Celsius or less, in which the second electrode is positioned between the second and third dielectric layers, and a third electrode comprising an integral material comprising a coefficient of thermal expansion of 15 ppm/deg. Celsius or less, in which the third electrode is positioned between the third and fourth dielectric layers.

In another aspect, a radiofrequency generator configured to electrically couple to a multipole assembly of a mass spectrometer comprises comprising a feedback circuit comprising a self-shielded capacitor, wherein the feedback circuit is configured to provide radio frequencies to the multipole assembly to permit the multipole assembly to be operative as a mass filter. The self-shielded capacitor may comprise outer shielding electrodes and inner electrodes, in which each of the outer shielding electrodes and the inner shielding electrodes are separated from each other through a dielectric medium, and in which each of the outer shielding electrodes and the inner shielding electrodes comprise integral material electrodes comprising a coefficient of thermal expansion of 15 ppm/deg. Celsius or less.

In an additional aspect, a capacitor comprising a plurality of electrodes each separated from other electrodes by a dielectric medium, in which at least two of the plurality of electrodes are configured as coplanar electrodes is provided.

In certain examples, the coplanar electrodes are present in the same dielectric layer.

In another aspect, a capacitor as described herein which is produced by three-dimensional printing of the electrodes, the dielectric medium or both to provide the capacitor is described.

In an additional aspect, a self-shielded capacitor as described herein which is produced by three-dimensional printing of the electrodes, the dielectric medium or both to provide the self-shielded capacitor is provided.

Additional aspects, configurations, embodiments, examples and features are described in more detail below.

BRIEF DESCRIPTION OF THE SEVERAL VIEWS OF THE DRAWINGS

Certain specific configurations of capacitors and systems are described below with reference to the accompanying figures in which.

It will be recognized by the person of ordinary skill in the art that the features shown in the figures are not necessarily shown to scale and are illustrated to facilitate a better understanding of the technology described herein.

DETAILED DESCRIPTION

Certain configurations described herein are directed to capacitors and circuits including them which can be used in radio frequency generators that are electrically coupled to some component of a mass filter. For example, the capacitor may be present in a feedback circuit of a RF generator configured to provide one or more RF signals to one or more poles of a multi-pole mass filter designed to select or guide ions in an ion beam.

While various electrode configurations are described below as having electrodes separated by a dielectric medium or layer, if desired, coplanar electrodes can be present where more than a single electrode is sandwiched between two dielectric layers. For example, two electrodes may be present in a common dielectric layer with some dielectric medium separating the two coplanar electrodes. Coplanar electrodes can still provide a capacitor as described herein as the electric field between the coplanar electrodes can be coupled by the surrounding dielectric material. If desired, more than two coplanar electrodes can be present in any single dielectric layer with some dielectric medium of the same layer separating the electrodes in that dielectric layer.

Figure 1:
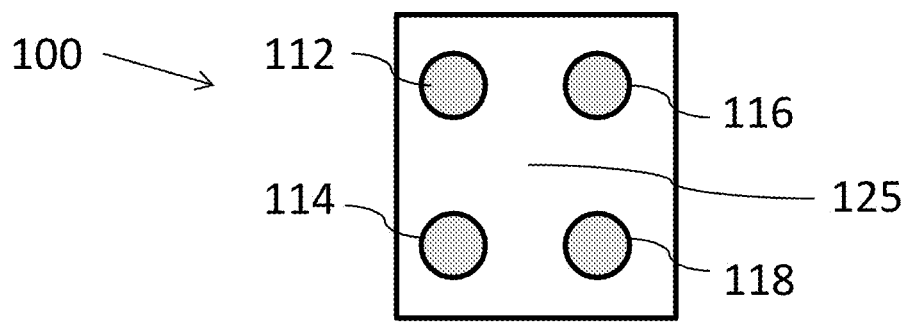
FIG. 1 is an illustration of a quadrupole, in accordance with certain examples.

In certain examples and referring to FIG. 1, a mass filter 100 may comprise a plurality of poles, which in this configuration is shown as a quadrupole with four separate poles or rods 112, 114, 116 and 118. Oscillating RF voltages from a RF generator are typically applied to each of the rods 112, 114, 116 and 118 in a selected amount to select or filter out ions with a specific m/z ratio. The filtered ions traverse through the central opening 125 of the quadrupole and are provided to a downstream detector (not shown) for detection or to another component downstream of the mass filter. The RF voltages can be changed to detect ions with a different m/z ratio as desired. A negative feedback loop can be implemented to generate controlled, stable electrical signals. When the loop gain of the feedback is sufficiently large, the stability of the signals from the RF generator can be governed by the stability of the passive components, such as the capacitors of the RF generator. In ceramic capacitors, however, temperature stability is typically limited to 15 ppm/° C. to 30 ppm/° C., with these coefficients of thermal expansion being determined, for example, by ASTM E831 dated 2000 and entitled "Standard Test Method for Linear Thermal Expansion of Solid Materials by Thermomechanical Analysis." Reference below and in the appended claims to materials having a certain coefficient of thermal expansion (CTE) is based on the CTE as tested by ASTM E831 dated 2000 unless otherwise noted. For ceramic capacitors, temperature changes of 10° C. or more can cause unstable RF signals to be generated. Further, ceramic capacitors tend to be unshielded, which adds additional unwanted noise to the RF signals.

In certain embodiments, to overcome the instability of ceramic capacitors, thin-film capacitors have been implemented in many circuits. Bonding of the thin films to substrates reduces the CTE of the thin film materials. However, production of thin film capacitors is costly and complex. Thin film capacitors are also typically unshielded, and mounting of thin film capacitors to printed circuit boards can be difficult without shoring the bottom electrode of the thin film capacitor. Further, CTE mismatch in the thin film materials and the other components of the capacitor can increase instability with increasing temperatures.

Figure 2:
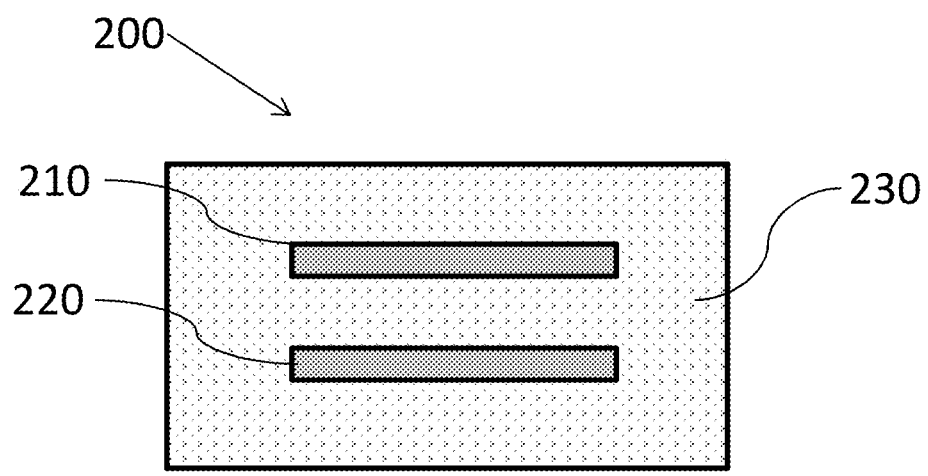
FIG. 2 is an illustration of a capacitor comprising integral material electrodes, in accordance with certain embodiments.

In some examples, integral materials electrodes with a low coefficient of thermal expansion can be used in the capacitors described herein. The term "integral material" refers to the electrode not including any thin films and generally being produced from solid materials, through in certain configurations, the electrode materials may be layered integral materials to increase the overall thickness of the electrodes. Referring to FIG. 2, a side view of a capacitor 200 is shown. The capacitor 200 comprises a first electrode 210 and a second electrode 220 spatially separated from the first electrode 210 through a dielectric material or medium 230. As noted in more detail below, each of the electrodes 210, 220 may comprise a low CTE material, e.g., one with a CTE less than 15 ppm/° C., or less than 10 ppm/° C. or even less than 5 ppm/° C., 3 ppm/° C. or 1 ppm/° C. such that little or no expansion of the electrodes 210, 220 occurs over a selected temperature range. Similarly, the dielectric material 230 may comprise a low CTE material, which may comprise about the same CTE as the materials of the electrodes 210, 220 so if any expansion occurs with increasing temperature then all of the materials expand at about the same rate. While not shown in FIG. 2, the electrodes 210, 220 typically comprise a site at one side or surface of the capacitor 200 to permit electrical coupling of the capacitor 200 to a circuit which may be part of an RF generator circuit or other electrical circuit. In the configuration of FIG. 2, the electrodes 210, 220 "float" within the dielectric material 230 and are not generally coupled to the dielectric material 230 using any adhesive or other material. In producing the capacitor 200, the electrodes 210, 220 can be held in a jig or mold in a fixed position from each other, and the dielectric material 230 can be poured, 3D-printed, or otherwise disposed into the mold at high temperature and permitted to solidify. Solidification (or curing) of the dielectric material 230 holds the electrodes 210, 220 in place without the need to use any adhesive or other materials to produce the capacitor 200. The entire block of the electrodes 210, 220 and dielectric material 230 can then be removed from the mold to provide the capacitor. If desired, channels or pathways can be drilled or produced in the dielectric material 230 to permit electrical coupling of each of the electrodes 210, 220 to the RF generator circuit. In other instances, slots can be machined into the dielectric medium 230, and the electrodes 210, 220 can be inserted into the slots and fixed in position by disposing additional dielectric medium around the inserted electrodes 210, 220 to seal any open space and fix the electrodes 210, 220 into position. The additional dielectric medium can be the same or different from the dielectric medium 230. By producing the capacitor 200 using integral material electrodes 210, 220 which are trapped within the dielectric medium 230, a more stable capacitor can be provided. As noted in more detail below, the electrodes 210, 220 can be sized and shaped to be the same or different and may comprise holes, apertures or other features to reduce the overall weight and/or the amount of material needed.

In certain examples, the materials used in the electrodes 210, 220 typically comprise a coefficient of thermal expansion of less than 15 ppm/° C. as tested by ASTM E831 dated 2000. While the exact CTE of the integral materials of the electrodes can vary, in some instances it may be desirable to select low CTE materials, e.g., those having a CTE of 5 ppm/° C. or less to increase overall stability of the capacitor with changing temperature. Illustrative materials for use in the electrodes 210, 220 include, but are not limited to, nickel iron alloys with a CTE of 15 ppm/° C. of less, e.g., Invar® alloys such as, for example, Invar 36, Super Invar, 52 Alloy, 48 Alloy, 46 Alloy, 42 Alloy, 42-6 Alloy, and the like. In other configurations, the integral material electrodes may comprise a zinc alloy with a CTE of 15 ppm/° C. or less. In some instances, the integral material electrodes may comprise a chromium nickel iron super alloy with a CTE of 15 ppm/° C. or less. In additional instances, the integral material electrodes may comprise iron cobalt nickel alloys with a CTE of 15 ppm/° C. or less, e.g., Kovar alloys. In other configurations, the integral material electrodes may comprise iron cobalt nickel aluminum titanium niobium alloys with a CTE of 15 ppm/° C. or less. While the exact useful temperature range of the integral materials of the electrodes can vary, the integral materials used in the electrodes typically comprise a CTE of 15 ppm/° C. or less over a temperature range of about 30° C. to about 900° C. In some instances, the material used in the integral material electrodes comprises a CTE of 10 ppm/° C. or less over a temperature range of about 30° C. to about 500° C. In other instances, the material used in the integral material electrodes comprises a CTE of about 5 ppm/° C. or less over a temperature range of about 30° C. to about 300° C. In additional configurations, the material used in the integral material electrodes comprises a CTE of about 2 ppm/° C. or less over a temperature range of about 30° C. to about 200° C. The materials used in the integral material electrodes 210, 220 can be the same or can be different. Further, the exact thickness and spacing of the electrodes 210, 220 can vary.

In some examples, illustrative materials for use as the dielectric medium 230 include, but are not limited to, low CTE quartz, e.g., quartz with a CTE of 15 ppm/° C. or less, metal oxides with a CTE of 15 ppm/° C. or less, glasses with a CTE of 15 ppm/° C. or less, semiconductors with a CTE of 15 ppm/° C. or less, sapphire based materials with a CTE of 15 ppm/° C. or less, diamond based materials with a CTE of 15 ppm/° C. or less. In some instances, the dielectric medium may be a single component dielectric medium with a generally homogeneous dielectric material being present. In other instances, a dopant or additive may be present in the dielectric medium to alter the overall properties of the dielectric medium. In a typical configuration, the dielectric medium is non-conductive and generally does not distort or otherwise interfere with (to a substantial degree) the functioning, e.g., the electric fields, of the integral material electrodes. Where a liquid dielectric medium is added to a mold comprising the electrodes 210, 220, the liquid dielectric medium is selected so the melting point of the liquid dielectric medium is at least 50° C. less, at least 100° C. less or at least 150° C. less than the melting point of the integral electrodes 210, 220 to prevent the electrodes 210, 220 from becoming liquid during production. In final form, the dielectric medium is desirably solid over the operating temperature range of the capacitor. In some instances, the dielectric layer 230 may be produced by stacking a plurality of separate dielectric layers on each other to provide a desired overall thickness.

Figure 3:
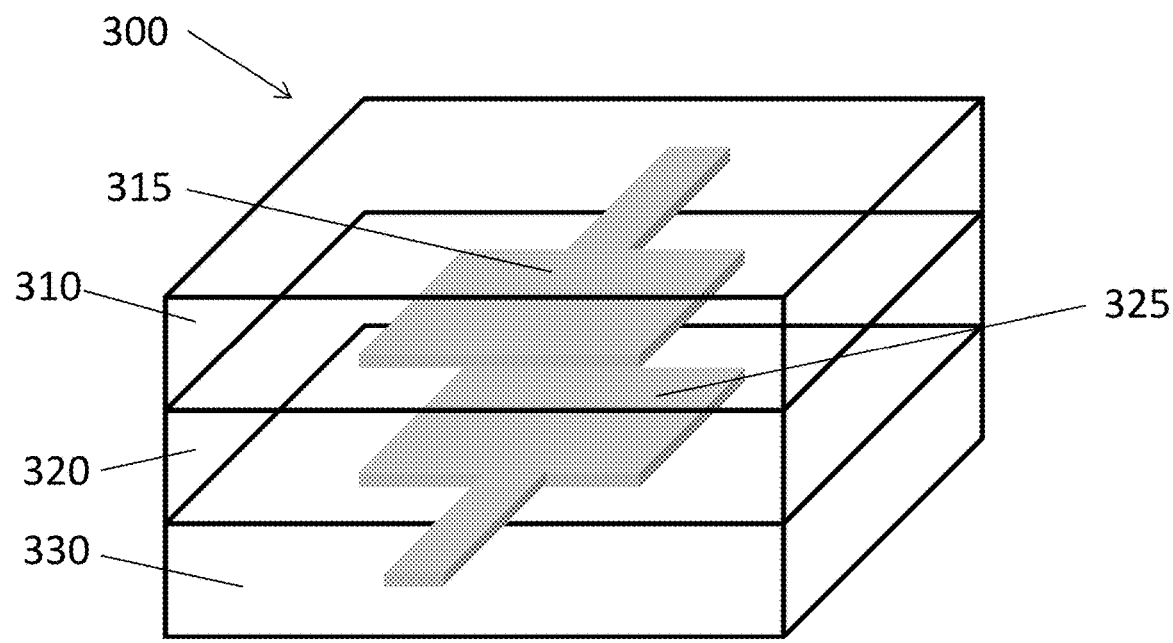
FIG. 3 is an illustration of a capacitor comprising two integral material electrodes sandwiched by dielectric layers, in accordance with certain examples.

In certain configurations, the capacitors described herein can also be produced by sandwiching two or more electrodes between individual dielectric layers. Referring to FIG. 3, a capacitor 300 is shown that comprises dielectric layers 310, 320 and 330. A first electrode 315 is positioned between the dielectric layers 310, 320, and a second electrode 325 is positioned between the dielectric layers 320, 330. Unlike most capacitors where the electrodes are strongly bonded to the dielectric media, in the configuration of FIG. 3, the electrodes 315, 325 are not glued or epoxied to the layers 310, 320 and 330. The electric field of the signal is mostly confined within the region between the electrodes 315, 325. In certain instances, that region is entirely free of foreign material (e.g., epoxy) so that only low CTE materials and perhaps a small amount of air are present in that region. By omitting epoxy or other adhesive materials in the region between the electrodes 315, 325, the capacitor is more stable with changes in temperature. For example, since the electrodes 315, 325 near the electric field of interest are not bonded to the layers 310, 320 and 330, the electrodes and dielectric layers are free to expand or contract independently with changing temperature. Any potential issue of cracking at the electrode/dielectric layer interface is minimized or eliminated.

In certain configurations, in producing the sandwiched capacitor shown in FIG. 3, the electrodes 315, 325 are each mechanically held against the dielectric layer 320, the dielectric layer 310 is added to the top of electrode 315, and the dielectric layer 330 is added to the bottom of the electrode 325. The entire construct is pressed together and can be held in place using, for example, low CTE adhesive or epoxy at the edges of the layers 310, 320 and 330. Alternatively, the dielectric layers 310, 320 and 330 can be fixed in place using mechanical fasteners such as screws or brackets without the need to use any epoxy or adhesive. In another configuration, the electrodes 315, 325 can be glued/epoxied at the terminals (outside the electric field of interest) to the dielectric layers 310, 320 and 330. Epoxy between the substrate gaps near the edges should not substantially affect the overall stability, because the epoxy is a relatively thin layer compared to the full thickness of the substrate and it is outside of the electric field of interest. If desired, the epoxy may be selected so that its CTE is about the same as the dielectric layers. In another configuration, the epoxy can be applied only to the outer edges of the dielectric substrates with the gaps between the dielectric substrates are free of epoxy and generally occupied by air space present from the electrodes 315, 325 being sandwiched between the layers 310, 320 and 330. In an alternative configuration, epoxy can be applied to the electrodes 315, 325 outer surfaces to fix electrode 315 to layer 310 and electrode 325 to layer 330. Epoxy is typically not present between the electrode 315 and the layer 320 or the electrode 325 and the layer 320 as the electric field of interest is present in the layer 320.

In certain examples, the materials used in the electrodes 315, 325 typically comprise a coefficient of thermal expansion of less than 15 ppm/° C. as tested by ASTM E831 dated 2000. While the exact CTE of the integral materials of the electrodes can vary, in some instances it may be desirable to select low CTE materials, e.g., those having a CTE of 5 ppm/° C. or less to increase overall stability of the capacitor with changing temperature. Illustrative materials for use in the electrodes 315, 325 include, but are not limited to, nickel iron alloys with a CTE of 15 ppm/° C. of less, e.g., Invar® alloys such as, for example, Invar 36, Super Invar, 52 Alloy, 48 Alloy, 46 Alloy, 42 Alloy, 42-6 Alloy, and the like. In other configurations, the integral material electrodes 315, 325 may comprise a zinc alloy with a CTE of 15 ppm/° C. or less. In some instances, the integral material electrodes 315, 325 may comprise a chromium nickel iron super alloy with a CTE of 15 ppm/° C. or less. In additional instances, the integral material electrodes 315, 325 may comprise iron cobalt nickel alloys with a CTE of 15 ppm/° C. or less, e.g. Kovar alloys. In other configurations, the integral material electrodes 315, 325 may comprise iron cobalt nickel aluminum titanium niobium alloys with a CTE of 15 ppm/° C. or less. While the exact useful temperature range of the integral materials 315, 325 of the electrodes can vary, the integral materials used in the electrodes 315, 325 typically comprise a CTE of 15 ppm/° C. or less over a temperature range of about 30° C. to about 900° C. In some instances, the material used in the integral material electrodes 315, 325 comprises a CTE of 10 ppm/° C. or less over a temperature range of about 30° C. to about 500° C. In other instances, the material used in the integral material electrodes 315, 325 comprises a CTE of about 5 ppm/° C. or less over a temperature range of about 30° C. to about 300° C. In additional configurations, the material used in the integral material electrodes 315, 325 comprises a CTE of about 2 ppm/° C. or less over a temperature range of about 30° C. to about 200° C. The materials used in the integral material electrodes 315, 325 can be the same or can be different. Further, the exact thickness and spacing of the electrodes 315, 325 can vary.

In some examples, illustrative materials for use as the dielectric medium of the layers 310, 320 and 330 include, but are not limited to, low CTE quartz, e.g., quartz with a CTE of 15 ppm/° C. or less, metal oxides with a CTE of 15 ppm/° C. or less, glasses with a CTE of 15 ppm/° C. or less, semiconductors with a CTE of 15 ppm/° C. or less, sapphire based materials with a CTE of 15 ppm/° C. or less, diamond based materials with a CTE of 15 ppm/° C. or less. In some instances, the dielectric medium in each of the layers 310, 320, 330 may be a single component dielectric medium with a generally homogeneous dielectric material being present.

In other instances, a dopant or additive may be present in one or more of the layers 310, 320, 330 to alter the overall properties of the dielectric medium. In a typical configuration, the dielectric medium is non-conductive and generally does not distort or otherwise interfere with (to a substantial degree) the functioning, e.g., the electric fields, of the integral material electrodes. Where a liquid dielectric medium is added to a mold comprising the electrodes 315, 325, the liquid dielectric medium is selected so the melting point of the liquid dielectric medium is at least 50° C. less, at least 100° C. less or at least 150° C. less than the melting point of the integral electrodes 315, 325 to prevent the electrodes 315, 325 from becoming liquid during production. In final form, the dielectric medium is desirably solid over the operating temperature range of the capacitor. The dielectric layers 310, 320 and 330 need not all have the same dielectric material or composition or the same thickness or shape. For example, one or more of the dielectric layers 310, 320 and 330 may be produced by stacking a plurality of separate dielectric layers on each other to provide a desired overall thickness.

Figure 4:
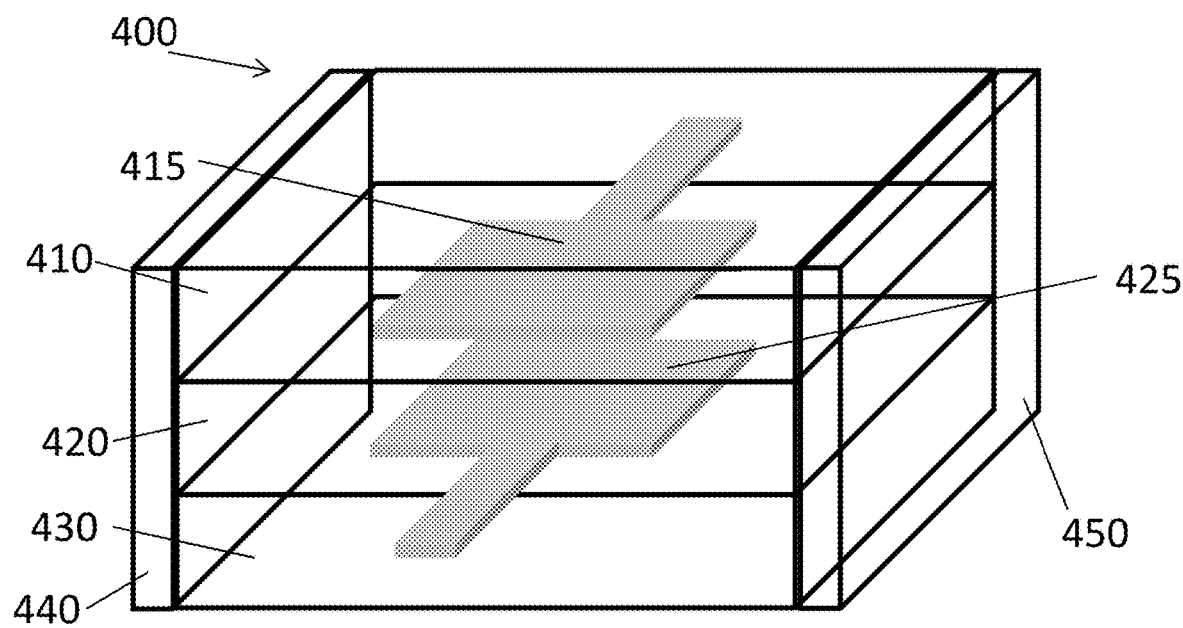
FIG. 4 is an illustration of a capacitor comprising two integral material electrodes sandwiched by dielectric layers and dielectric end caps, in accordance with certain examples.

In certain examples and referring to FIG. 4, another configuration of a capacitor is shown. The capacitor 400 comprises electrodes 415, 425, dielectric layers 410, 420 and 430 and dielectric end caps 440 and 450. The electrode 415 is positioned between the dielectric layers 410, 420, and the electrode 425 is positioned between the dielectric layers 420, 430. The electrodes 415, 425 are not glued or epoxied to the layers 410, 420 and 430. The electric field of the signal is mostly confined within the region between the electrodes 415, 425. In certain instances, that region is entirely free of foreign material (e.g., epoxy) so that only low CTE materials and perhaps a small amount of air is present in that region. By omitting epoxy or other adhesive in the region between the electrodes 415, 425, the capacitor is more stable. For example, since the electrodes 415, 425 near the electric field of interest are not bonded to the layers 410, 420 and 430, the electrodes and dielectric layers are free to expand or contract independently with changing temperature. Any potential issue of cracking at the electrode/dielectric layer interface is minimized or eliminated. Further, the end caps 440, 450 can be epoxied or glued at the sides to each of the dielectric layers 410, 420 and 430 so that no epoxy or adhesive is present in the body of the capacitor 400. The end caps 440, 450 may also comprise a low CTE material, which can further enhance stability since the epoxy or adhesive's coefficient of thermal expansion will be overcome by the low CTE of the end caps 440, 450. The dimensions and small gaps between the layers 410, 420 and 430 can be fixed by coupling the layers to the end caps 440, 450.

In certain examples, in producing the sandwiched capacitor shown in FIG. 4, the electrodes 415, 425 are each mechanically held against the dielectric layer 420, the dielectric layer 410 is added to the top of electrode 415, and the dielectric layer 430 is added to the bottom of the electrode 425. The entire assembly is pressed together. The end caps 440 and 450 are then adhered to each of the layers 410, 420 and 430 at the edges of these layers using an epoxy or adhesive. For example, a low CTE adhesive or epoxy, e.g., one with a CTE of 15 ppm/° C. or less, can be added at the outer edges of the layers 410, 420 and 430, and the end caps 440, 450 may then be placed at the sides of the layers 410, 420 and 430 to fix the position of the electrodes 415, 425 and the layers 410, 420 and 430. Alternatively, the end caps 440, 450 can be held to the dielectric layers 410, 420 and 430 using mechanical fasteners such as screws or brackets without the need to use any epoxy or adhesive. In another configuration, the epoxy can be applied to the outer edges of the dielectric layers 410, 420, 430 and to the outer surfaces of the layers 410, 420, 430 so multiple different epoxy sites are present to hold the layers 410, 420 and 430 in place. In an alternative configuration, epoxy can also be applied to the electrodes 415, 425 outer surfaces to fix electrode 415 to layer 410 and electrode 425 to layer 430. Epoxy is typically not present between the electrode 415 and the layer 420 or the electrode 425 and the layer 420 as the electric field of interest is present in the layer 420.

In certain examples, the materials used in the electrodes 415, 425 typically comprise a coefficient of thermal expansion of less than 15 ppm/° C. as tested by ASTM E831 dated 2000. While the exact CTE of the integral materials of the electrodes can vary, in some instances it may be desirable to select low CTE materials, e.g., those having a CTE of 5 ppm/° C. or less to increase overall stability of the capacitor with changing temperature. Illustrative materials for use in the electrodes 415, 425 include, but are not limited to, nickel iron alloys with a CTE of 15 ppm/° C. of less, e.g., Invar® alloys such as, for example, Invar 36, Super Invar, 52 Alloy, 48 Alloy, 46 Alloy, 42 Alloy, 42-6 Alloy, and the like. In other configurations, the integral material electrodes 415, 425 may comprise a zinc alloy with a CTE of 15 ppm/° C. or less. In some instances, the integral material electrodes 415, 425 may comprise a chromium nickel iron super alloy with a CTE of 15 ppm/° C. or less. In additional instances, the integral material electrodes 415, 425 may comprise iron cobalt nickel alloys with a CTE of 15 ppm/° C. or less, e.g. Kovar alloys. In other configurations, the integral material electrodes 415, 425 may comprise iron cobalt nickel aluminum titanium niobium alloys with a CTE of 15 ppm/° C. or less. While the exact useful temperature range of the integral materials 415, 425 of the electrodes can vary, the integral materials used in the electrodes 415, 425 typically comprise a CTE of 15 ppm/° C. or less over a temperature range of about 30° C. to about 900° C. In some instances, the material used in the integral material electrodes 415, 425 comprises a CTE of 10 ppm/° C. or less over a temperature range of about 30° C. to about 500° C. In other instances, the material used in the integral material electrodes 415, 425 comprises a CTE of about 5 ppm/° C. or less over a temperature range of about 30° C. to about 300° C. In additional configurations, the material used in the integral material electrodes 415, 425 comprises a CTE of about 2 ppm/° C. or less over a temperature range of about 30° C. to about 200° C. The materials used in the integral material electrodes 415, 425 can be the same or can be different. Further, the exact thickness and spacing of the electrodes 415, 425 can vary.

In some examples, illustrative materials for use as the dielectric medium of the layers 410, 420 and 430 and the end caps 440, 450 include, but are not limited to, low CTE quartz, e.g., quartz with a CTE of 15 ppm/° C. or less, metal oxides with a CTE of 15 ppm/° C. or less, glasses with a CTE of 15 ppm/° C. or less, semiconductors with a CTE of 15 ppm/° C. or less, sapphire based materials with a CTE of 15 ppm/° C. or less, diamond based materials with a CTE of 15 ppm/° C. or less. In some instances, the dielectric medium in each of the layers 410, 420, 430 and the end caps 440, 450 may be a single component dielectric medium with a generally homogeneous dielectric material being present. In other instances, a dopant or additive may be present in one or more of the layers 410, 420, 430 and/or the end caps 440, 450 to alter the overall properties of the dielectric medium. In a typical configuration, the dielectric medium is non-conductive and generally does not distort or otherwise interfere with (to a substantial degree) the functioning, e.g., the electric fields, of the integral material electrodes. Where a liquid dielectric medium is added to a mold comprising the electrodes 415, 425, the liquid dielectric medium is selected so the melting point of the liquid dielectric medium is at least 50° C. less, at least 100° C. less or at least 150° C. less than the melting point of the integral electrodes 415, 425 to prevent the electrodes 415, 425 from becoming liquid during production. In final form, the dielectric medium is desirably solid over the operating temperature range of the capacitor. The dielectric layers 410, 420 and 430 need not all have the same dielectric material or composition or the same thickness or shape. For example, one or more of the dielectric layers 410, 420 and 430 may be produced by stacking a plurality of separate dielectric layers on each other to provide a desired overall thickness. Similarly, the end caps 440, 450 may comprise a different dielectric medium from the layers 410, 420, 430 and/or a different thickness and/or shape. For example, if desired, the end caps may take the form of thin strips of material which can be adhered to the sides of the layers 410, 420 and 430 to fix those layers into position. In other instances, the end caps 440, 450 can be configured as generally L-shaped members which can engage two or more different surfaces of the capacitor 400 to fix the layers 410, 420 and 430 into position. If desired, one or both of the end caps 440, 450 may comprise a plurality of individual layers which are stacked together to provide an overall desired thickness.

Figure 5:
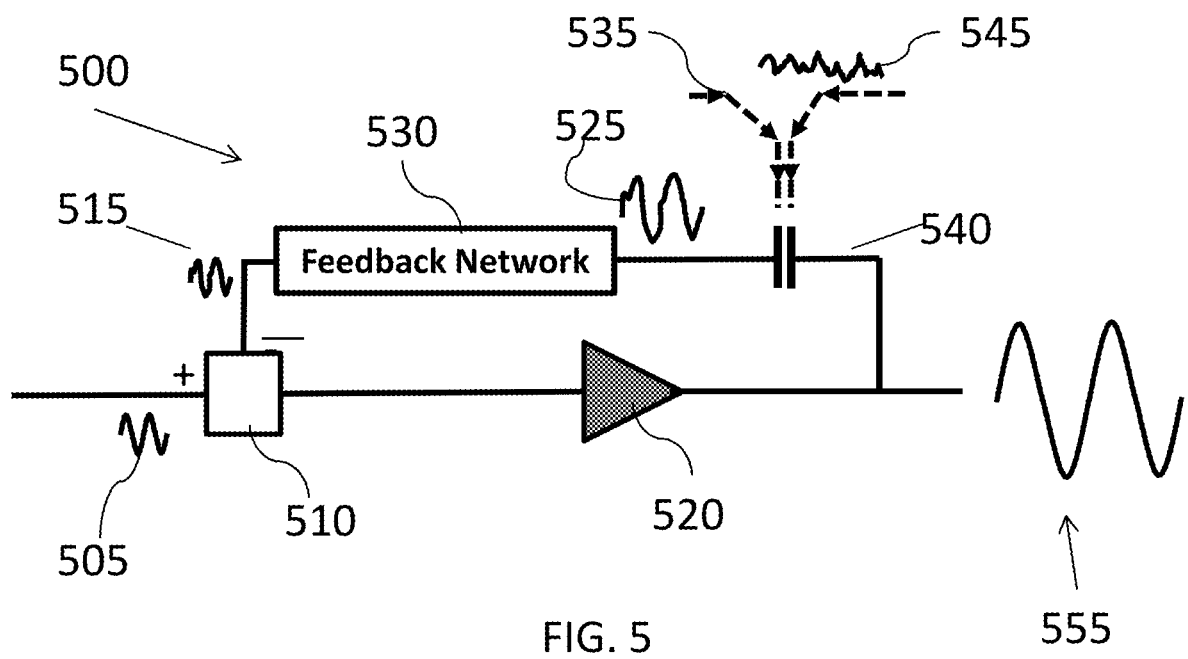
FIG. 5 is an illustration of a circuit configured to provide an output signal, in accordance with certain embodiments.

In certain instances, it may be desirable to shield some portion of the capacitor to prevent the RF signals from being affected by any external parasitic capacitive coupling. An illustration how parasitic capacitive coupling may arise is shown using the circuit 500 of FIG. 5 as one example. An intended signal 505, or intended amplitude set point of a signal, is shown as being provided to the circuit 500 comprising a difference amplifier, or a passive signal summer where the feedback is inverted and added to the intended signal 510, an amplifier 520, a feedback network 530 and an output feedback capacitor 540. Undesirable external noise 545 and/or parasitic capacitive coupling 535 from external components, e.g., a grounded metal housing, can add noise to the signal 525 provided to the capacitor 540, which generally cannot be corrected using the feedback loop of the circuit 500. For example, capacitors are often used as part of a feedback network to sample an RF output signal stabilized by a negative feedback loop, e.g., a high voltage RF generator configured to drive a quadrupole mass filter in a mass spectrometry instrument. Despite the use of a stable capacitor in a negative feedback loop, the stability or integrity of the output signal 555 is degraded if there is unstable parasitic capacitive coupling 535 to components adjacent to the capacitor or if EMI noise 545 is radiated from other components. This kind of signal error cannot be corrected by the feedback loop and provides an unstable feedback signal 515 and a resulting unstable output signal 555.

Figure 6:
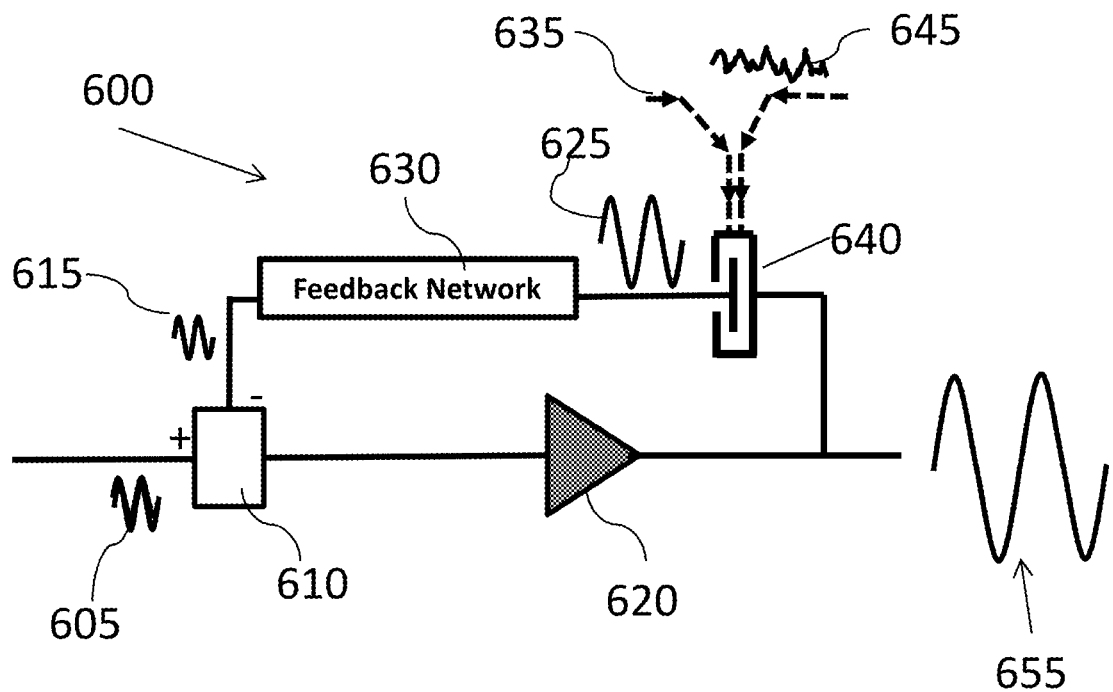
FIG. 6 is an illustration of another circuit configured to provide an output signal, in accordance with certain embodiments.

In certain configurations, the capacitors described herein may be self-shielded so that the feedback signals from the capacitor are not substantially affected by external noise or unstable parasitic capacitive coupling. Referring to the circuit 600 shown in FIG. 6, an intended signal 605, or intended amplitude set point of a signal, is shown as being provided to the circuit 600 comprising a difference amplifier, or a passive signal summer where the feedback is inverted and added to the intended signal 610, an amplifier 620, a feedback network 630 and a shielded output feedback capacitor 640. Undesirable external noise 645 and/or parasitic capacitive coupling 635 from external components do not add noise to the output signal 655 since the capacitor 640 is self-shielded. Due to the high gain of the feedback loop, the output 655 is stabilized by the feedback loop with a low output impedance. The output signal 655 and the other signals 605, 615 and 625 are unaffected by external parasitic coupling. Noise injected to the output will also be generally be suppressed, e.g., when the noise is at a lower frequency than the feedback loop response time. The self-shielding nature of the capacitor can be used to shield the other electrodes with a sensitive feedback signal from external noise or unstable parasitic coupling. As noted below, the self-shielding can be implemented in combination with the integral material electrodes or, if desired, self-shielding can be implemented with other types of electrodes, e.g., thin film electrodes or ceramic electrodes if desired.

Figure 7:
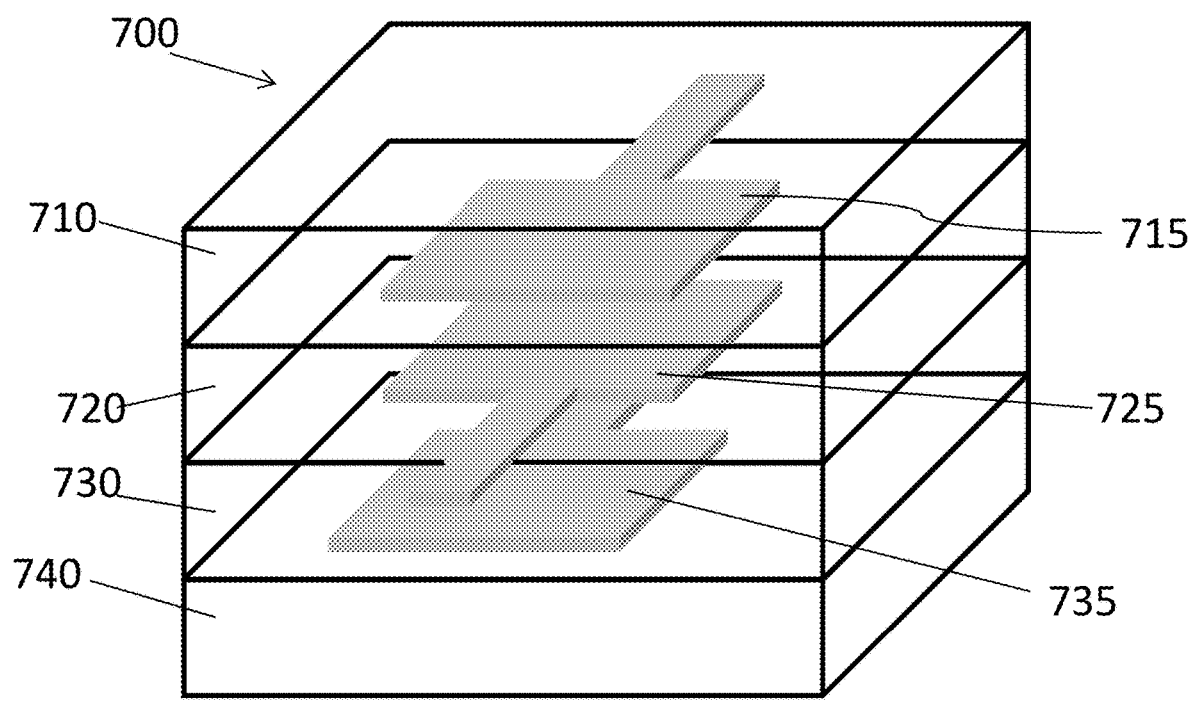
FIG. 7 is an illustration of a self-shielded capacitor comprising three integral material electrodes, in accordance with certain examples.

In certain examples and referring to FIG. 7, one illustration of a self-shielded capacitor 700 is shown. The self-shielded capacitor 700 comprises electrodes 715, 725 and 735 positioned within or between dielectric layers 710, 720, 730, and 740. Electrode 715 is between layers, 710, 720. Electrode 725 is between layers 720, 730. Electrode 735 is between layers 730, 740. The electrodes 715, 725 are each mechanically held against the dielectric layer 720, the dielectric layer 710 is added to the top of electrode 715, and the dielectric layer 730 is added to the bottom of the electrode 725. The electrode 735 can then be held against the dielectric layer 730, and the dielectric layer 740 can be coupled to the electrode 735. The entire construct is pressed together and can be held in place using, for example, low CTE adhesive or epoxy at the edges of the layers 710, 720, 730 and 740. If desired, end caps (not shown) similar to those of FIG. 4 can be coupled to the layers 710, 720, 730 and 740. Alternatively, the dielectric layers 710, 720, 730 and 740 can be fixed in place using mechanical fasteners such as screws or brackets without the need to use any epoxy or adhesive. In another configuration, the electrodes 715, 725 and 735 can be glued/epoxied at the terminals (outside the electric field of interest) to the dielectric layers 710, 720, 730 and 740. Epoxy between the substrate gaps near the edges should not substantially affect the overall stability, because the epoxy is a relatively thin layer compared to the full thickness of the substrate and it is outside of the electric field of interest. If desired, the epoxy may be selected so that its CTE is about the same as the dielectric layers. In another configuration, the epoxy can be applied only to the outer edges of the dielectric substrates with the gaps between the dielectric substrates (which are free of epoxy and generally occupied by air space) present from the electrodes 715, 725 and 735 being sandwiched between the layers 710, 720, 730 and 740. In an alternative configuration, epoxy can be applied to the electrodes 715, 725, 735 outer surfaces to fix electrode 715 to layer 710, and to fix the electrode 735 to layer 740. Epoxy is typically not present between the electrodes 715, 725 and 735. In use of the capacitor 700, the electrodes 715 and 735 can be electrically connected to each other and used to provide the output signal. As noted in connection with FIG. 6, the output signal is stabilized by a negative feedback loop. Electrodes 715, 735 act to shield the electrode 725, which is carrying the sensitive feedback signal. Shielding of the electrode 725 by the electrodes 715, 735 prevents introduction of external noise or perturbations into the feedback signal and provides a more stable output signal.

In certain examples, the materials used in the electrodes 715, 725, 735 typically comprise a coefficient of thermal expansion of less than 15 ppm/° C. as tested by ASTM E831 dated 2000. While the exact CTE of the integral materials of the electrodes can vary, in some instances it may be desirable to select low CTE materials, e.g., those having a CTE of 5 ppm/° C. or less to increase overall stability of the capacitor with changing temperature. Illustrative materials for use in the electrodes 715, 725, 735 include, but are not limited to, nickel iron alloys with a CTE of 15 ppm/° C. of less, e.g., Invar® alloys such as, for example, Invar 36, Super Invar, 52 Alloy, 48 Alloy, 46 Alloy, 42 Alloy, 42-6 Alloy and the like. In other configurations, the integral material electrodes 715, 725, 735 may comprise a zinc alloy with a CTE of 15 ppm/° C. or less. In some instances, the integral material electrodes 715, 725, 735 may comprise a chromium nickel iron super alloy with a CTE of 15 ppm/° C. or less. In additional instances, the integral material electrodes 715, 725, 735 may comprise iron cobalt nickel alloys with a CTE of 15 ppm/° C. or less, e.g. Kovar alloys. In other configurations, the integral material electrodes 715, 725, 735 may comprise iron cobalt nickel aluminum titanium niobium alloys with a CTE of 15 ppm/° C. or less. While the exact useful temperature range of the integral materials 715, 725, 735 of the electrodes can vary, the integral materials used in the electrodes 715, 725, 735 typically comprise a CTE of 15 ppm/° C. or less over a temperature range of about 30° C. to about 900° C. In some instances, the material used in the integral material electrodes 715, 725, 735 comprises a CTE of 10 ppm/° C. or less over a temperature range of about 30° C. to about 500° C. In other instances, the material used in the integral material electrodes 715, 725, 735 comprises a CTE of about 5 ppm/° C. or less over a temperature range of about 30° C. to about 300° C. In additional configurations, the material used in the integral material electrodes 715, 725, 735 comprises a CTE of about 2 ppm/° C. or less over a temperature range of about 30° C. to about 200° C. The materials used in the integral material electrodes 715, 725, 735 can be the same or can be different. Further, the exact thickness and spacing of the electrodes 715, 725, and 735 can vary, and the spacing between electrodes 715 and 725 need not be the same as the spacing between electrodes 725 and 735.

In some examples, illustrative materials for use as the dielectric medium of the layers 710, 720, 730 and 740 include, but are not limited to, low CTE quartz, e.g., quartz with a CTE of 15 ppm/° C. or less, metal oxides with a CTE of 15 ppm/° C. or less, glasses with a CTE of 15 ppm/° C. or less, semiconductors with a CTE of 15 ppm/° C. or less, sapphire based materials with a CTE of 15 ppm/° C. or less, diamond based materials with a CTE of 15 ppm/° C. or less. In some instances, the dielectric medium in each of the layers 710, 720, 730 and 740 may be a single component dielectric medium with a generally homogeneous dielectric material being present. In other instances, a dopant or additive may be present in one or more of the layers 710, 720, 730 and 740 to alter the overall properties of the dielectric medium. In a typical configuration, the dielectric medium is non-conductive and generally does not distort or otherwise interfere with (to a substantial degree) the functioning, e.g., the electric fields, of the integral material electrodes. Where a liquid dielectric medium is added to a mold comprising the electrodes 715, 725, 735, the liquid dielectric medium is selected so the melting point of the liquid dielectric medium is at least 50° C. less, at least 100° C. less or at least 150° C. less than the melting point of the integral electrodes 715, 725, 735 to prevent the electrodes 715, 725, 735 from becoming liquid during production. In final form, the dielectric medium is desirably solid over the operating temperature range of the capacitor. The dielectric layers 710, 720, 730 and 740 need not all have the same dielectric material or composition or the same thickness or shape. In some instances, one or more of the dielectric layers 710, 720, 730, 740 may be produced by stacking a plurality of separate dielectric layers on each other to provide a desired overall thickness.

While the configurations described above in connection with FIGS. 2, 3-4 and 7 include two or three electrodes, it may be desirable to include four, five or more separate electrodes in the capacitors described herein. In particular, where self-shielded capacitors are used, the presence of four or more electrodes may provide certain desirable attributes including highly stable output signals.

Figure 8:
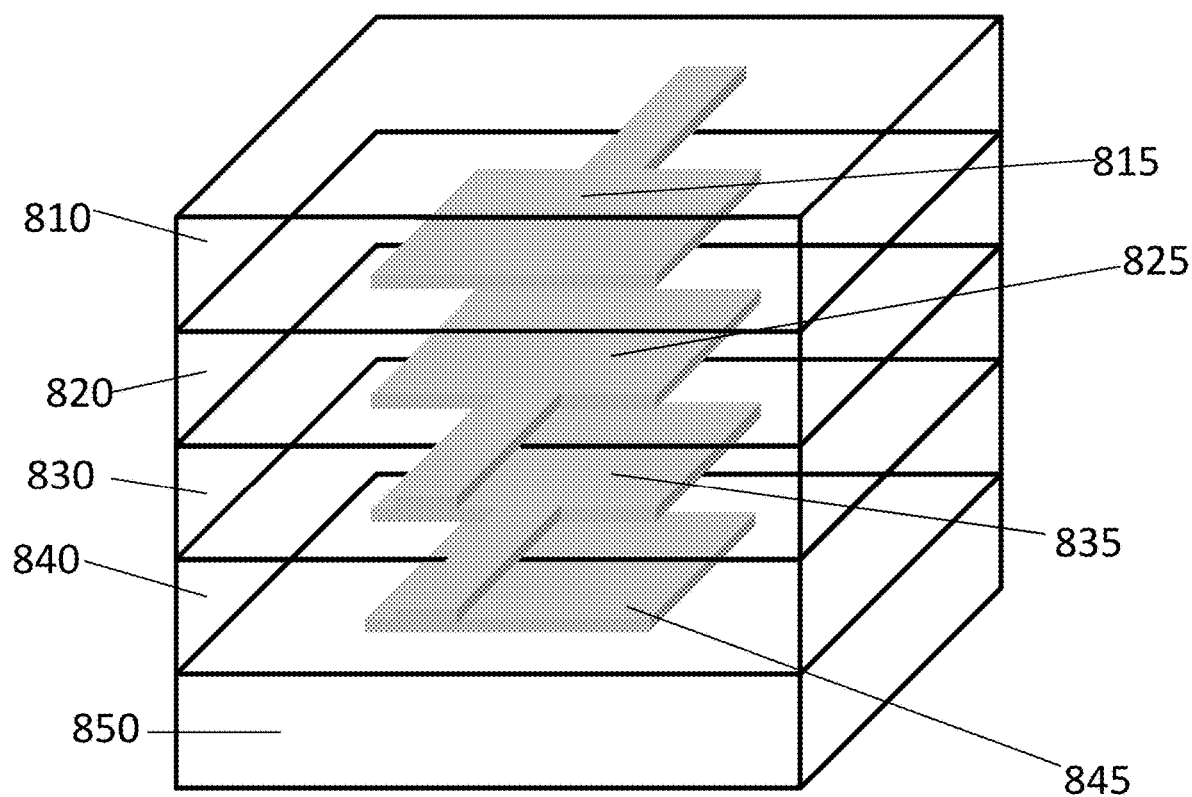
FIG. 8 is an illustration of a self-shielded capacitor comprising four integral material electrodes, in accordance with certain examples.

In certain configurations and referring to FIG. 8, a four electrode capacitor 800 is shown. The capacitor comprises electrodes 815, 825, 835 and 845 and dielectric layers 810, 820, 830, 840 and 850. Electrode 815 is sandwiched between the layers 810, 820, electrode 825 is sandwiched between the layers 820, 830, electrode 835 is sandwiched between layers 830, 840 and electrode 845 is sandwiched between layers 840, 850. The electrodes 815, 825 are each mechanically held against the dielectric layer 820, the dielectric layer 810 is added to the top of electrode 815, and the dielectric layer 830 is added to the bottom of the electrode 825. The electrode 835 can then be held against the dielectric layer 830, and the dielectric layer 840 can be coupled to the electrode 835. The electrode 845 can then be held against the dielectric layer 840, and the dielectric layer 850 can be coupled to the electrode 845. The entire construct is pressed together and can be held in place using, for example, low CTE adhesive or epoxy at the edges of the layers 810, 820, 830, 840 and 850. If desired, end caps (not shown) similar to those of FIG. 4 can be coupled to the layers 810, 820, 830, 840 and 850. Alternatively, the dielectric layers 810, 820, 830, 840 and 850 can be fixed in place using mechanical fasteners such as screws or brackets without the need to use any epoxy or adhesive. In another configuration, the electrodes 815, 825, 835 and 845 can be glued/epoxied at the terminals (outside the electric field of interest) to the dielectric layers 810, 820, 830, 840 and 850. Epoxy between the substrate gaps near the edges should not substantially affect the overall stability, because the epoxy is a relatively thin layer compared to the full thickness of the substrate and it outside of the electric field of interest. If desired, the epoxy may be selected so that its CTE is about the same as the dielectric layers. In another configuration, the epoxy can be applied only to the outer edges of the dielectric substrates with the gaps between the dielectric substrates are free of epoxy and generally occupied by air space present from the electrodes 815, 825, 835 and 845 being sandwiched between the layers 810, 820, 830, 840 and 850. In an alternative configuration, epoxy can be applied to the electrodes 815, 845 outer surfaces to fix electrode 815 to layer 810, and to fix electrode 845 to the layer 850. Epoxy is typically not present between the electrodes 815, 825, 835 and 845. In use of the capacitor 800, electrodes 815 and 845 can be configured to carry the differential output signals, which are stabilized by a negative feedback loop, as discussed in more detail in connection with FIG. 9. Electrodes 815, 845 also shield electrodes 825, 835, which carry the sensitive differential feedback signals. Shielding of the electrodes 825, 835 by the electrodes 815, 845 prevents introduction of external noise or perturbations into the feedback signal and provides a more stable output signal.

In certain examples, the materials used in the electrodes 815, 825, 835 and 845 typically comprise a coefficient of thermal expansion of less than 15 ppm/° C. as tested by ASTM E831 dated 2000. While the exact CTE of the integral materials of the electrodes can vary, in some instances it may be desirable to select low CTE materials, e.g., those having a CTE of 5 ppm/° C. or less to increase overall stability of the capacitor with changing temperature. Illustrative materials for use in the electrodes 815, 825, 835 and 845 include, but are not limited to, nickel iron alloys with a CTE of 15 ppm/° C. of less, e.g., Invar® alloys such as, for example, Invar 36, Super Invar, 52 Alloy, 48 Alloy, 46 Alloy, 42 Alloy, 42-6 Alloy and the like. In other configurations, the integral material electrodes 815, 825, 835, 845 may comprise a zinc alloy with a CTE of 15 ppm/° C. or less. In some instances, the integral material electrodes 815, 825, 835, 845 may comprise a chromium nickel iron super alloy with a CTE of 15 ppm/° C. or less. In additional instances, the integral material electrodes 815, 825, 835, 845 may comprise iron cobalt nickel alloys with a CTE of 15 ppm/° C. or less, e.g. Kovar alloys. In other configurations, the integral material electrodes 815, 825, 835, 845 may comprise iron cobalt nickel aluminum titanium niobium alloys with a CTE of 15 ppm/° C. or less. While the exact useful temperature range of the integral materials 815, 825, 835, 845 of the electrodes can vary, the integral materials used in the electrodes 815, 825, 835, 845 typically comprise a CTE of 15 ppm/° C. or less over a temperature range of about 30° C. to about 900° C. In some instances, the material used in the integral material electrodes 815, 825, 835, 845 comprises a CTE of 10 ppm/° C. or less over a temperature range of about 30° C. to about 500° C. In other instances, the material used in the integral material electrodes 815, 825, 835, 845 comprises a CTE of about 5 ppm/° C. or less over a temperature range of about 30° C. to about 300° C. In additional configurations, the material used in the integral material electrodes 815, 825, 835, 845 comprises a CTE of about 2 ppm/° C. or less over a temperature range of about 30° C. to about 200° C. The materials used in the integral material electrodes 815, 825, 835, 845 can be the same or can be different. Further, the exact thickness and spacing of the electrodes 815, 825, 835, and 845 can vary, and the spacing between electrodes 815 and 825 need not be the same as the spacing between electrodes 835 and 845.

In some examples, illustrative materials for use as the dielectric medium of the layers 810, 820, 830, 840 and 850 include, but are not limited to, low CTE quartz, e.g., quartz with a CTE of 15 ppm/° C. or less, metal oxides with a CTE of 15 ppm/° C. or less, glasses with a CTE of 15 ppm/° C. or less, semiconductors with a CTE of 15 ppm/° C. or less, sapphire based materials with a CTE of 15 ppm/° C. or less, diamond based materials with a CTE of 15 ppm/° C. or less. In some instances, the dielectric medium in each of the layers 810, 820, 830, 840 and 850 may be a single component dielectric medium with a generally homogeneous dielectric material being present. In other instances, a dopant or additive may be present in one or more of the layers 810, 820, 830, 840 and 850 to alter the overall properties of the dielectric medium. In a typical configuration, the dielectric medium is non-conductive and generally does not distort or otherwise interfere with (to a substantial degree) the functioning, e.g., the electric fields, of the integral material electrodes. Where a liquid dielectric medium is added to a mold comprising the electrodes 815, 825, 835, 845 the liquid dielectric medium is selected so the melting point of the liquid dielectric medium is at least 50° C. less, at least 100° C. less or at least 150° C. less than the melting point of the integral electrodes 815, 825, 835, 845 to prevent the electrodes 815, 825, 835, 845 from becoming liquid during production. In final form, the dielectric medium is desirably solid over the operating temperature range of the capacitor. The dielectric layers 810, 820, 830, 840 and 850 need not all have the same dielectric material or composition or the same thickness or shape. For example, one or more of the dielectric layers 810, 820, 830, 840 and 850 may be produced by stacking a plurality of separate dielectric layers on each other to provide a desired overall thickness.

Figure 9:
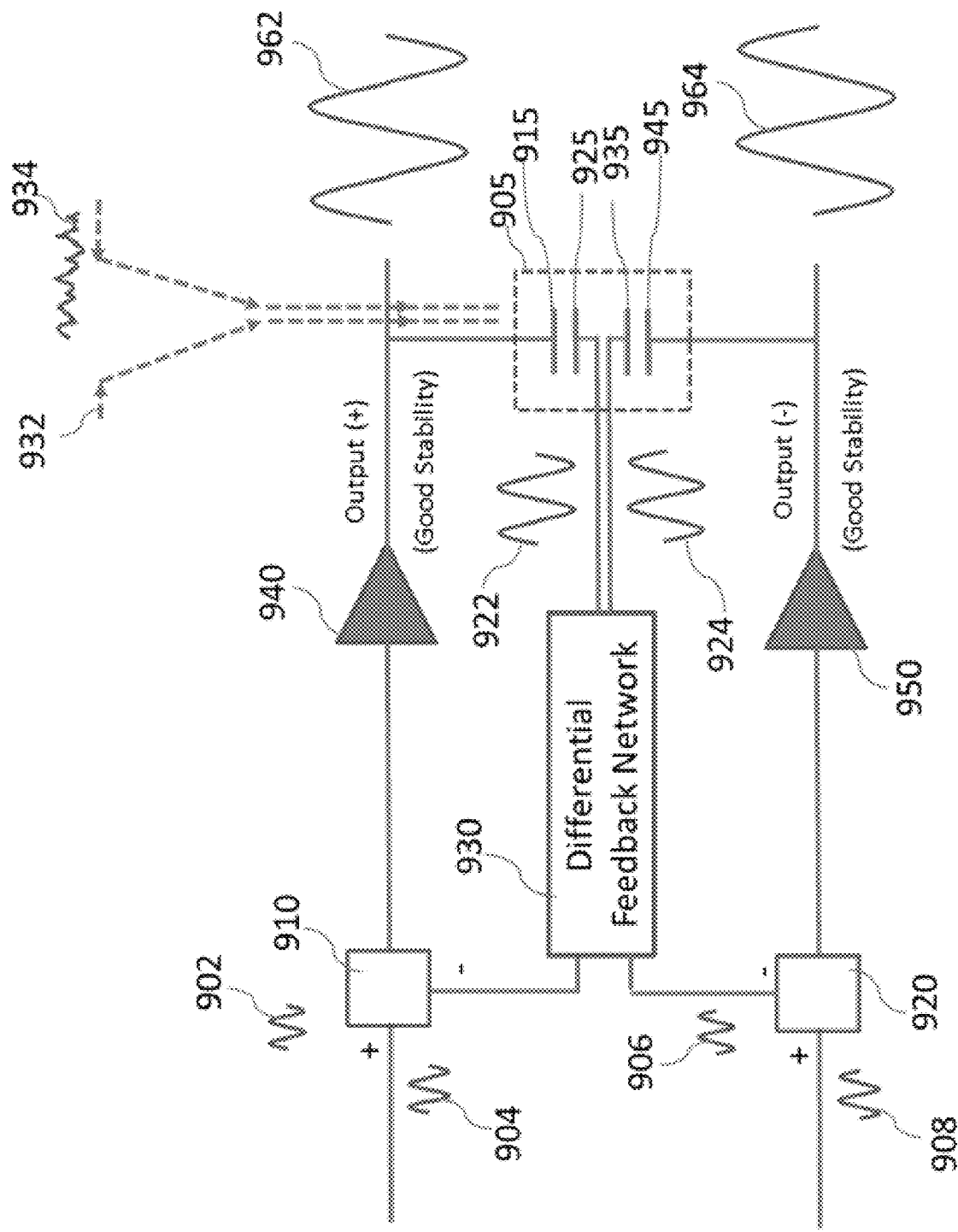
FIG. 9 is an illustration of a circuit configured to provide a differential output signal and which includes the capacitor of FIG. 8, in accordance with certain configurations.

In certain examples, the self-shielded four electrode capacitor can be used to provide differential output signals as shown in FIG. 9. The capacitor 905 is electrically coupled to a differential feedback network 930, difference amplifier, or a passive signal summer where the feedback is inverted and added to the intended signal 910, 920, and amplifiers 940, 950. Intended differential signals, or intended amplitude set point of differential signals, 902, 904, 906 and 908—are provided to the circuit 900. The outer electrodes 915, 945 of the capacitor 905 provide stabilized +/− output signals 962, 964 as a result of shielding the inner electrodes 925, 935 of the capacitor 905 from undesirable noise 934 and/or parasitic capacitive coupling 932. The inner shielded electrodes 925, 935 carry the +/− feedback signals 922, 924 which result in continued stabilization of the resulting output signals 962, 964 even with changes in temperature and expansion of the electrode materials and/or dielectric materials.

Figure 10:
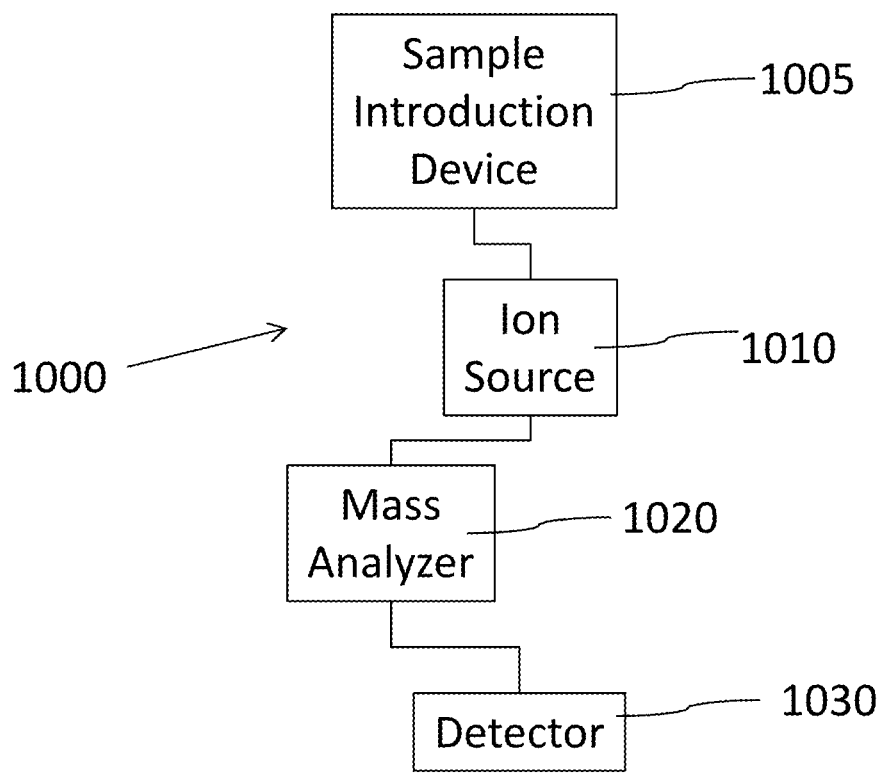
FIG. 10 is a block diagram of a mass spectrometer, in accordance with certain examples.
Figure 12A:
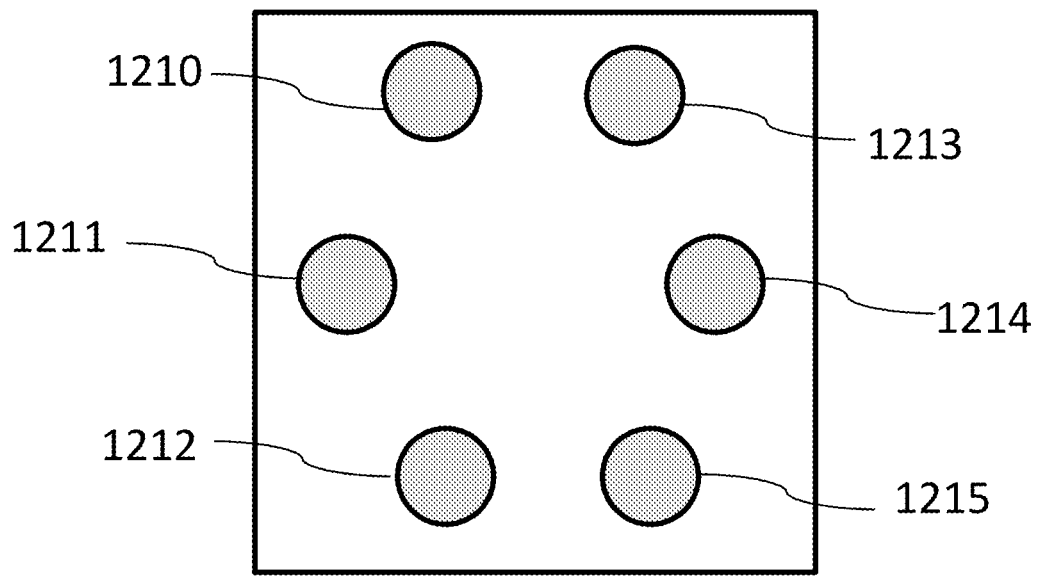
FIG. 12A is an illustration of a hexapole.
Figure 12B:
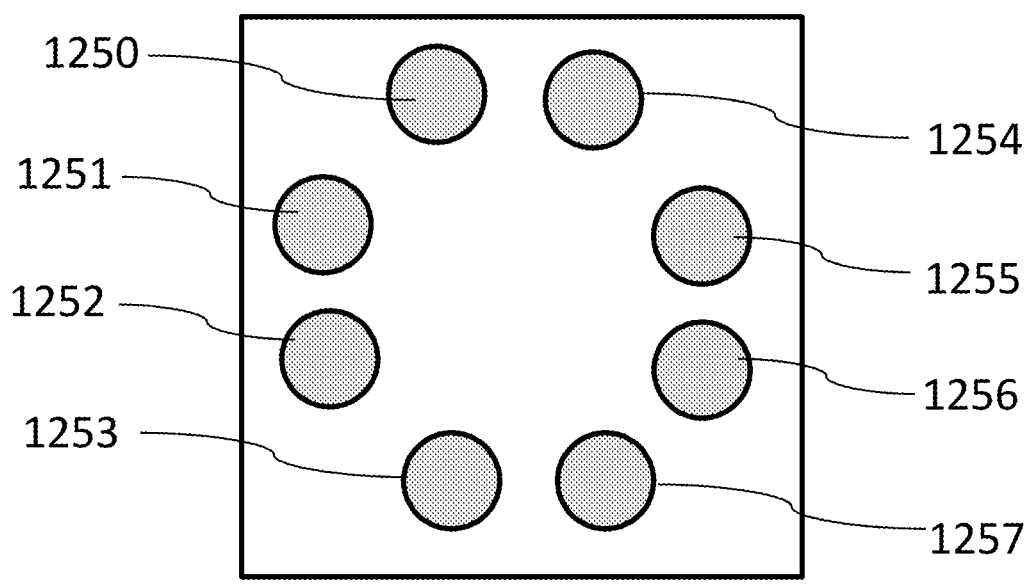
FIG. 12B is an illustration of an octopole, in accordance with certain embodiments.

In certain embodiments, the capacitors described herein may be particularly desirable for use in mass spectrometry instruments comprising a multipole mass filter. For example, the multipole may be configured as a quadrupole, a hexapole (FIG. 12A) or an octopole (FIG. 12B). Referring to FIG. 10, several components of a mass spectrometer are shown. The mass spectrometer comprises an ion source 1010, a mass analyzer 1020, an optional sample introduction device 1005 fluidically coupled to the ion source, and an optional detector 1030 fluidically coupled to the mass analyzer. In some configurations, the sample introduction device 1005 may be configured to aerosolize a liquid sample. Illustrative sample introduction devices include, but are not limited to, nebulizers, spray chambers, spray heads and similar devices. The ion source 1010 may take many forms and typically provides one or more ions. Illustrative ion or ionization sources include, but are not limited to, plasmas (e.g., inductively coupled plasmas, capacitively coupled plasmas, microwave-induced plasmas, etc.), arcs, sparks, drift ion devices, devices that can ionize a sample using gas-phase ionization (e.g., electron ionization, chemical ionization, desorption chemical ionization, negative-ion chemical ionization), field desorption devices, field ionization devices, fast atom bombardment devices, secondary ion mass spectrometry devices, electrospray ionization devices, probe electrospray ionization devices, sonic spray ionization devices, atmospheric pressure chemical ionization devices, atmospheric pressure photoionization devices, atmospheric pressure laser ionization devices, matrix assisted laser desorption ionization devices, aerosol laser desorption ionization devices, surface-enhanced laser desorption ionization devices, glow discharges, resonant ionization, thermal ionization, thermospray ionization, radioactive ionization, ion-attachment ionization, liquid metal ion devices, laser ablation electrospray ionization, or combinations of any two or more of these illustrative ionization devices.

Figure 11:
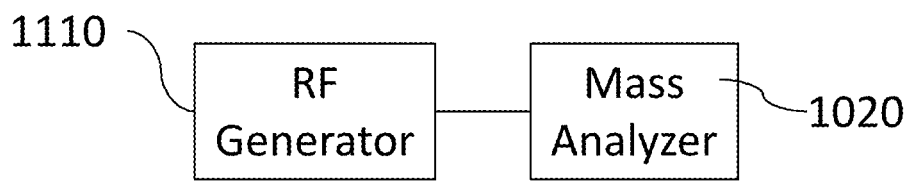
FIG. 11 is a block diagram showing a RF generator electrically coupled to a mass analyzer, in accordance with certain embodiments.

In certain embodiments, the mass analyzer 1020 may take numerous forms depending generally on the sample nature, desired resolution, etc., and exemplary mass analyzers can include one or more quadrupoles, hexapoles, octopoles, collision cells, reaction cells or other components as desired. In certain instances, the mass analyzer 1020 is electrically coupled to a RF generator 1110 as shown in FIG. 11. For example, the RF generator 1110 may comprise a feedback circuit comprising one or more of the capacitors described herein, e.g., a self-shielded three electrode or four electrode capacitor, as part of a circuit. For example, the RF generator driving the mass filters may comprise driven mode circuits where the RF source is a local oscillator or from a RF synthesizer, direct digital synthesizer or other suitable sources.

In the case of a quadrupole mass analyzer, the RF generator 1110 provides an output to the quadrupolar rods of the mass analyzer. As an ion beam enters the mass analyzer, ions within the beam are separated based on their m/z ratios as a result of adopting different trajectories in the oscillating electric fields that are provided by the quadrupolar rods by way of the oscillating signals from the RF generator 1110. The particular signals which are provided to the rods can be selected to permit selection of ions of a desired m/z ratio from the ion beam. The selected ions are then provided to the detector 1030, which may comprise any suitable detection device that may be used with existing mass spectrometers, e.g., electron multipliers, Faraday cups, coated photographic plates, scintillation detectors, etc., and other suitable devices that will be selected by the person of ordinary skill in the art, given the benefit of this disclosure.

While a quadrupole is described in connection with the mass spectrometry system of FIG. 10, it will be recognized by the person of ordinary skill in the art, given the benefit of this disclosure, that a hexapole rod assembly (FIG. 12A) with six rods 1210-1215 or an octopole rod assembly (FIG. 12B) with eight rods 1250-1257 could be used instead. In addition, the mass analyzer may comprise a sectioned multipole assembly with different multipole sections electrically coupled to each other in an appropriate manner, e.g., through one or more lenses. Any one or more of the sections of the multipole assembly may be electrically coupled to an RF generator comprising a capacitor as described herein.

In certain embodiments, the entire mass spectrometer system, including the RF generator 1110 comprising a capacitor as described herein, is typically controlled using a computer system that includes a microprocessor and/or suitable software for analysis of samples introduced into system. The computer system typically is separate from the mass spectrometry system, but a processor or other device may be integrated into the systems if desired. The processor can be used, for example, to control the RF signals applied to the mass analyzer, to detect ions arriving at the detector, to control vacuum pressure in the system, etc. The computer system typically includes at least one processor electrically coupled to one or more memory units to receive data from the mass spectrometry systems or devices. The computer system may be, for example, a general-purpose computer such as those based on Unix, Intel PENTIUM-type processor, Motorola PowerPC, Sun UltraSPARC, Hewlett-Packard PA-RISC processors, or any other type of processor. One or more of any type computer system may be used according to various embodiments of the technology. Further, the system may be connected to a single computer or may be distributed among a plurality of computers attached by a communications network. A general-purpose computer system may be configured, for example, to perform any of the described functions including but not limited to: ion detection, voltage control and the like. It should be appreciated that other functions, including network communication, can be performed and the technology is not limited to having any particular function or set of functions. Various aspects of the systems and methods may be implemented as specialized software executing in a general-purpose computer system. The computer system may include a processor connected to one or more memory devices, such as a disk drive, memory, or other device for storing data. Memory is typically used for storing programs and data during operation of the computer system. Components of the computer system may be coupled by an interconnection device, which may include one or more buses (e.g., between components that are integrated within a same machine) and/or a network (e.g., between components that reside on separate discrete machines). The interconnection device provides for communications (e.g., signals, data, instructions) to be exchanged between components of the system. The computer system typically can receive and/or issue commands within a processing time, e.g., a few milliseconds, few microseconds or less, to permit rapid control of the mass spectrometry systems. The computer system typically is electrically coupled to a power source, a detector, etc. such that electrical signals may be provided to and from the computer and the coupled devices. The computer system may also include one or more input devices, for example, a keyboard, mouse, trackball, microphone, touch screen, manual switch (e.g., override switch) and one or more output devices, for example, a printing device, display screen, speaker. In addition, the computer system may contain one or more interfaces that connect the computer system to a communication network (in addition or as an alternative to the interconnection device). The computer system may also include suitable circuitry to convert signals received from the detector and/or other components of the system. Such circuitry can be present on a printed circuit board or may be present on a separate board or device that is electrically coupled to the printed circuit board through a suitable interface, e.g., a serial ATA interface, ISA interface, PCI interface or the like or through one or more wireless interfaces, e.g., Bluetooth, WiFi, Near Field Communication or other wireless protocols and/or interfaces. In some instances, the computer system can be electrically coupled to a printed circuit board comprising one or more of the capacitors described herein.

In certain embodiments, the storage system of the computer typically includes a computer readable and writeable nonvolatile recording medium in which codes can be stored that can be used by a program to be executed by the processor or information stored on or in the medium to be processed by the program. The medium may, for example, be a disk, solid state drive or flash memory. Typically, in operation, the processor causes data to be read from the nonvolatile recording medium into another memory that allows for faster access to the information by the processor than does the medium. This memory is typically a volatile, random access memory such as a dynamic random access memory (DRAM) or static memory (SRAM). It may be located in the storage system or in the memory system. The processor generally manipulates the data within the integrated circuit memory and then copies the data to the medium after processing is completed. For example, the processor may receive signals from the detector and display those signals in the form of ion peaks. A variety of mechanisms are known for managing data movement between the medium and the integrated circuit memory element and the technology is not limited thereto. The technology is also not limited to a particular memory system or storage system. In certain embodiments, the computer system may also include specially-programmed, special-purpose hardware, for example, an application-specific integrated circuit (ASIC) or a field programmable gate array (FPGA). Aspects of the technology may be implemented in software, hardware or firmware, or any combination thereof. Further, such methods, acts, systems, system elements and components thereof may be implemented as part of the computer system described above or as an independent component. Although a computer system is described by way of example as one type of computer system upon which various aspects of the technology may be practiced, it should be appreciated that aspects are not limited to being implemented on the described computer system. Various aspects may be practiced on one or more computers having a different architecture or components. The computer system may be a general-purpose computer system that is programmable using a high-level computer programming language. The computer system may be also implemented using specially programmed, special purpose hardware. In the computer system, the processor is typically a commercially available processor such as the well-known Pentium class processors available from the Intel Corporation. Many other processors are available. Such a processor usually executes an operating system which may be, for example, the Windows 95, Windows 98, Windows NT, Windows 2000 (Windows ME), Windows XP, Windows Vista, Windows 7, Windows 8 or Windows 10 operating systems available from the Microsoft Corporation, MAC OS X, e.g., Snow Leopard, Lion, Mountain Lion or other versions available from Apple, the Solaris operating system available from Sun Microsystems, or UNIX or Linux operating systems available from various sources. Many other operating systems may be used, and in certain embodiments a simple set of commands or instructions may function as the operating system.

In certain examples, the processor and operating system may together define a computer platform for which application programs in high-level programming languages may be written. It should be understood that the technology is not limited to a particular computer system platform, processor, operating system, or network. Also, it should be apparent to those skilled in the art, given the benefit of this disclosure, that the present technology is not limited to a specific programming language or computer system. Further, it should be appreciated that other appropriate programming languages and other appropriate computer systems could also be used. In certain examples, the hardware or software can be configured to implement cognitive architecture, neural networks or other suitable implementations. If desired, one or more portions of the computer system may be distributed across one or more computer systems coupled to a communications network. These computer systems also may be general-purpose computer systems. For example, various aspects may be distributed among one or more computer systems configured to provide a service (e.g., servers) to one or more client computers, or to perform an overall task as part of a distributed system. Various aspects may also be performed on a client-server or multi-tier system that includes components distributed among one or more server systems that perform various functions according to various embodiments. These components may be executable, intermediate (e.g., IL) or interpreted (e.g., Java) code which communicate over a communication network (e.g., the Internet) using a communication protocol (e.g., TCP/IP). It should also be appreciated that the technology is not limited to executing on any particular system or group of systems. Also, it should be appreciated that the technology is not limited to any particular distributed architecture, network, or communication protocol.

In some instances, various embodiments may be programmed using an object-oriented programming language, such as, for example, SQL, SmallTalk, Basic, Java, Javascript, PHP, C++, Ada, Python, iOS/Swift, Ruby on Rails or C # (C-Sharp). Other object-oriented programming languages may also be used. Alternatively, functional, scripting, and/or logical programming languages may be used. Various configurations may be implemented in a non-programmed environment (e.g., documents created in HTML, XML or other format that, when viewed in a window of a browser program, render aspects of a graphical-user interface (GUI) or perform other functions). Certain configurations may be implemented as programmed or non-programmed elements, or any combination thereof.

Figure 13A:
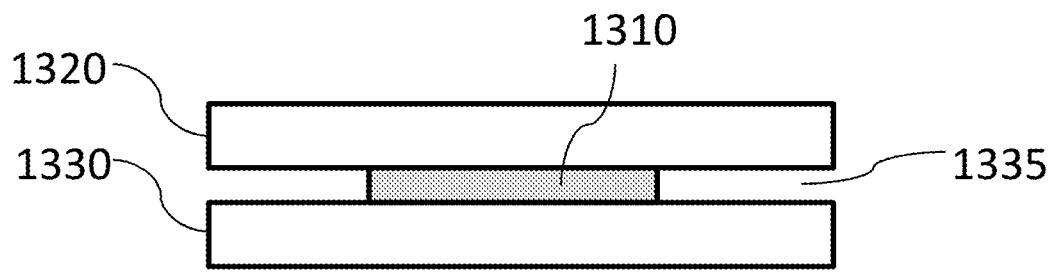
FIGS. 13A-13C are views of an electrode/dielectric layer assembly, in accordance with certain embodiments.
Figure 13B:
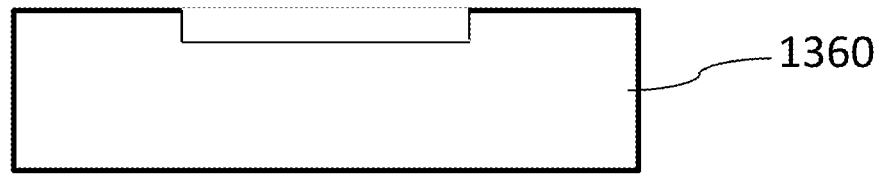
Figure 13C:
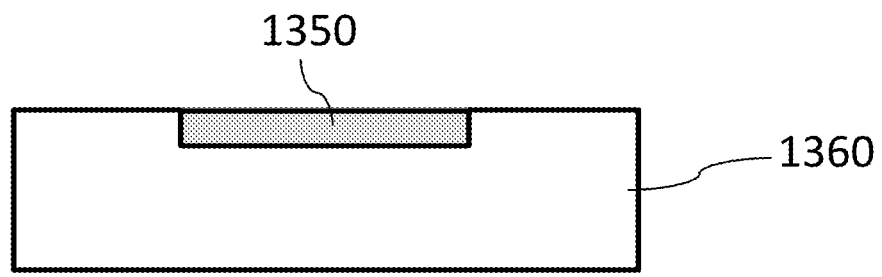

In certain configurations, to produce the capacitors described herein, the various components can be sandwiched as noted above or, if desired, a suitable amount of material can be removed from one of the dielectric layers to permit placement of the integral material electrode in the removed portion. For example and referring to FIG. 13A, sandwiching of an electrode 1310 between dielectric layers 1320, 1330 can provide an air gap 1335 between the layers 1320, 1330. As noted herein, this air gap can be sealed at the edges using an epoxy or other materials, or alternatively, a gasket or thin sheet of dielectric material can be placed in the air gap 1335 to seal the interior space of the capacitor. To avoid the presence of an air gap, a suitable amount of material can be removed from a surface of a dielectric layer, and the electrode can be placed into the space once occupied by the removed material. Referring to FIG. 13B, a side view a dielectric layer 1360 with removed material is shown. An electrode 1350 is shown as being placed into the space in the layer 1360 in FIG. 13C which provides a substantially planar or flat surface across the dielectric layer 1360. This configuration permits coupling of an additional dielectric layer (not shown) to the top surface of the layer 1360 with disposed electrode 1350 without producing any open air space between the dielectric layers.

Figure 14:
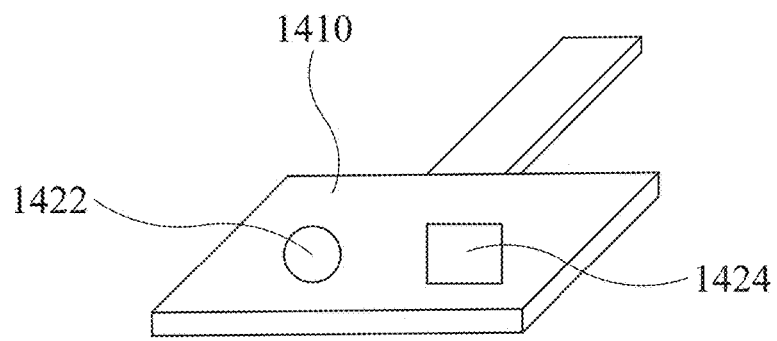
FIG. 14 is an illustration of an integral material electrode comprising apertures, in accordance with certain examples.

In certain embodiments, the electrodes described herein may comprise apertures or openings in the bodies of the electrodes. The exact shape, size, geometry and number of the apertures can vary. In some instances, the presence of the apertures can act to reduce the overall weight of the capacitor. The openings or apertures can be occupied by air or by a dielectric material as desired. Referring to FIG. 14, an electrode 1410 is shown as comprising a first aperture 1422 and a second aperture 1424. The placement of the apertures is not critical, and the number and placement of the apertures can vary from electrode to electrode within the same capacitor. For example, one or more electrodes may comprise at least one aperture while other electrodes may be solid and lack apertures. The apertures are typically present prior to assembly of the capacitors, but if desired, they can be added post assembly by drilling or machining operations.

In certain instances, the capacitors described herein can be present in a feedback circuit of a RF generator configured to couple to one or more rods of a multipole assembly. The exact configuration of the capacitor present in the feedback circuit may vary, and the capacitor may include, two, three, four or more integral material electrodes and can be unshielded or self-shielded as desired.

Certain specific examples which include a capacitor as described herein are discussed in more detail below.

Example 1

Figure 15:
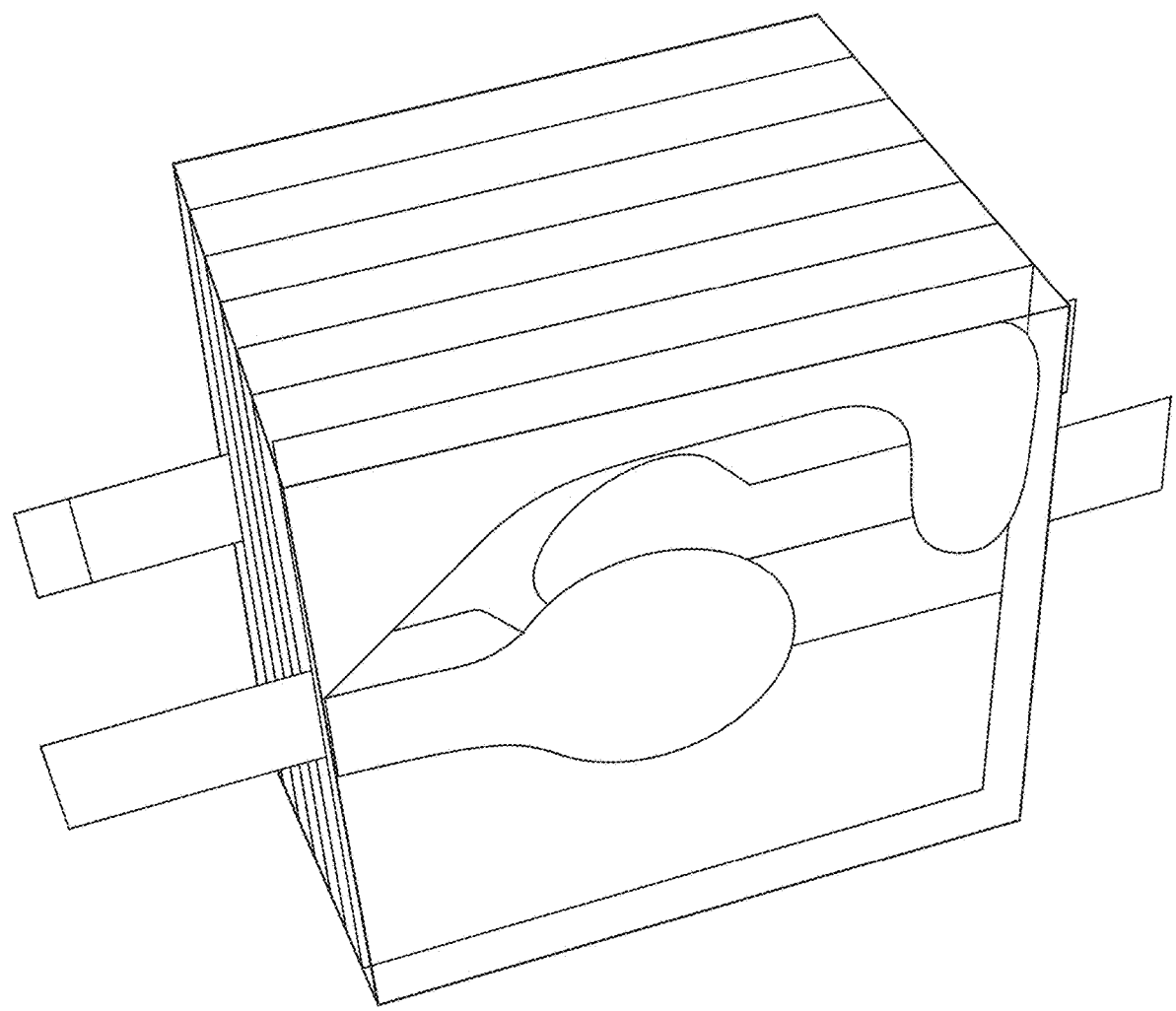
FIG. 15 is a photograph of a self-shielded four electrode capacitor, in accordance with certain configurations.

A self-shielded four electrode capacitor was produced by sandwiching low CTE Invar 36 alloy electrodes (CTE<1 ppm/° C.) between low CTE quartz dielectric layers (CTE<1.0 ppm/° C.). A photograph of the resulting capacitor is shown in FIG. 15. The dielectric layers were coupled to each other using a low CTE epoxy material at the outer edges of each of the dielectric layers. No epoxy material was present underneath or between the area below the electrodes. The electrode terminals for the outer electrodes were present on one side of the capacitor, and the electrode terminals for the inner electrodes were present on an opposite side of the capacitor. The compact design permitted drop in placement without the need for any special box or enclosure to shield the capacitor. The sensitive low voltage signals from the inner electrodes were shielded by the high voltage signals of the outer electrodes.

Example 2

The capacitor of Example 1 was tested for its stability. The capacitor was present as part of a feedback loop (as shown in FIG. 9) present in a 10 kV peak-to-peak high voltage RF generator. The RF generator was used to drive a quadrupole mass filter of a mass spectrometry instrument. Table 1 shows the measured drift of the RF generator output, which is mainly contributed by the drift of the self-shielded capacitor in the feedback network plus the minor drift from the rest of the circuit components in the RF generator, and Table 2 shows the measured drift when ceramic capacitors (Ceramic NP0 capacitors) were used.

TABLE 1

| Temperature (deg. Celsius) | Reference Output Feedback (Volts) | Comments |
|---|---|---|
| 26.7 | 2.16744 | At maximum 10 kV peak-to-peak, the drift was −2.7 ppm |
| 36.7 | 2.16738 | |

TABLE 2

| Temperature (deg. Celsius) | Reference Output Feedback (Volts) | Comments |
|---|---|---|
| 26.7 | 2.53749 | At maximum 10 kV peak-to-peak, the drift was −26.0 ppm |
| 36.7 | 2.53683 | |

The drift of the RF generator with changes in temperature were much lower (about 10× lower) when the self-shielded capacitor of Example 1 was used (Table 1) as compared to the drift when conventional ceramic capacitors (Ceramic NP0) were used (Table 2). The results were consistent with the self-shielded capacitor providing a more stable output as a function of changing temperature.

When introducing elements of the examples disclosed herein, the articles "a," "an," "the" and "said" are intended to mean that there are one or more of the elements. The terms "comprising," "including" and "having" are intended to be open-ended and mean that there may be additional elements other than the listed elements. It will be recognized by the person of ordinary skill in the art, given the benefit of this disclosure, that various components of the examples can be interchanged or substituted with various components in other examples.

Although certain aspects, examples and embodiments have been described above, it will be recognized by the person of ordinary skill in the art, given the benefit of this disclosure, that additions, substitutions, modifications, and alterations of the disclosed illustrative aspects, examples and embodiments are possible.

The invention claimed is:
1. A mass filter comprising:
a multipole assembly comprising a first pole, a second pole, a third pole and a fourth pole;
a radio frequency generator electrically coupled to each of the first pole, the second pole, the third pole and the fourth pole of the multipole assembly to provide a radio frequency voltage to each of the first pole, the second pole, the third pole and the fourth pole, the radio frequency generator comprising a feedback circuit comprising a capacitor, in which the capacitor comprises:
a first dielectric layer comprising a coefficient of thermal expansion of 15 ppm/deg. Celsius or less;
a first electrode layer comprising an integral, solid material, wherein the first electrode layer comprises a coefficient of thermal expansion of 15 ppm/deg. Celsius or less;
a second dielectric layer, in which the first electrode layer is positioned between the first dielectric layer and the second dielectric layer, wherein the second dielectric layer comprises a coefficient of thermal expansion of 15 ppm/deg. Celsius or less;
a second electrode layer spatially separated from the first electrode layer through the second dielectric layer and comprising an integral, solid material, wherein the second electrode layer comprises a coefficient of thermal expansion of 15 ppm/deg. Celsius or less;
a third dielectric layer, in which the second electrode layer is positioned between the second dielectric layer and the third dielectric layer, and wherein a coefficient of thermal expansion of the third dielectric layer is 15 ppm/deg, Celsius or less;
a third electrode layer spatially separated from the second electrode layer through the third dielectric layer and comprising an integral, solid material, wherein the third electrode layer comprises a coefficient of thermal expansion of 15 ppm/deg. Celsius or less;
a fourth dielectric layer, in which the third electrode layer is positioned between the third dielectric layer and the second dielectric layer, and wherein a coefficient of thermal expansion of the fourth dielectric layer is 15 ppm/deg. Celsius or less;
a fourth electrode layer spatially separated from the third electrode layer through the fourth dielectric layer and comprising an integral, solid material, wherein the fourth electrode layer comprises a coefficient of thermal expansion of 15 ppm/deg. Celsius or less;
a fifth dielectric layer, in which the fourth electrode layer is positioned between the fourth dielectric layer and the fifth dielectric layer, and wherein a coefficient of thermal expansion of the fifth dielectric layer is 15 ppm/deg. Celsius or less;
wherein the first, second, third and fourth electrode layers are mechanically held against and between adjacent dielectric layers, wherein the first electrode layer and the fourth electrode layer are positioned to shield the second electrode layer and the third electrode layer from stray capacitive energy, wherein the adjacent dielectric layers are coupled to each other at outer edges, using an epoxy material comprising a coefficient of thermal expansion of 15 ppm/deg. Celsius or less, to hold the capacitor together, and wherein electrode terminals for each of the second electrode layer and the third electrode layer are present on a first side of the capacitor to electrically couple the second electrode layer and the third electrode layer to the feedback circuit through the terminals on the first side of the capacitor, and wherein electrode terminals for each of the first electrode layer and the fourth electrode layer are present on the second side of the capacitor to electrically couple the first electrode layer and the fourth electrode layer to the feedback circuit through the terminals on the second side of the capacitor.

2. The mass filter of claim 1, in which the integral solid material of the first electrode is different from the integral solid material of the second electrode.

3. The mass filter of claim 1, in which the first electrode layer is positioned between the first and second dielectric layers without an adhesive between the first and second dielectric layers.

4. The mass filter of claim 3, in which the second electrode layer is positioned between the second and third dielectric layers without an adhesive between the second and third dielectric layers.

5. The mass filter of claim 1, in which the integral solid material of each of the first electrode layer and the second electrode layer each comprises a metal alloy.

6. The mass filter of claim 5, in which the metal alloy comprises a coefficient of thermal expansion of 5 ppm/deg. Celsius or less.

7. The mass filter of claim 6, in which a dielectric material in at least one of the first dielectric layer, the second dielectric layer and the third dielectric layer is different from a dielectric material in one of the other dielectric layers.

8. The mass filter of claim 6, in which the first dielectric layer and the second dielectric layer comprise the same dielectric material.

9. The mass filter of claim 6, in which the first dielectric layer, the second dielectric layer and the third dielectric layer comprise the same dielectric material.

10. The mass filter of claim 9, in which the dielectric material of the first dielectric layer, the second dielectric layer and the third dielectric layer comprises quartz comprising a coefficient of thermal expansion of 5 ppm/deg. Celsius or less.

11. The mass filter of claim 1, in which the first electrode layer and the second electrode layer are constructed and arranged without any films.

12. The mass filter of claim 1, in which at least one edge of the first dielectric layer is fused to an edge of the second dielectric layer to retain the first electrode layer between the first dielectric layer and the second dielectric layer.

13. The mass filter of claim 12, in which at least one edge of the second dielectric layer is fused to an edge of the third dielectric layer to retain the second electrode between the second dielectric layer and the third dielectric layer.

14. The mass filter of claim 1, further comprising an aperture in the integral, solid material of the first electrode layer.

15. The mass filter of claim 14, further comprising an aperture in the integral, solid material of the second electrode layer.

16. The mass filter of claim 1, in which the coefficient of thermal expansion of the second dielectric layer is about the same as the coefficient of thermal expansion of the integral, solid material of the first electrode layer and the same as the coefficient of thermal expansion of the integral, solid material of the second electrode layer.

17. The mass filter of claim 1, wherein the coefficient of thermal expansion of each of the first dielectric layer, the first electrode layer, the second dielectric layer, the second electrode layer, the third dielectric layer, the third electrode layer, the fourth dielectric layer, the fourth electrode layer and the fifth dielectric layer are about the same, and wherein the first electrode layer and the fourth electrode layer are configured to shield the second electrode layer and the third electrode layer when a voltage is provided to the first electrode layer and the fourth electrode layer.

* * * * *